(12) United States Patent
Hong et al.

(10) Patent No.: US 11,912,282 B2
(45) Date of Patent: Feb. 27, 2024

(54) METHOD FOR GENERATING MAGNETIC FIELD, METHOD FOR DETECTING LANE BY USING MAGNETIC FIELD, AND VEHICLE USING SAME

(71) Applicant: Jeongseok Chemical Corporation, Jeollabuk-do (KR)

(72) Inventors: Jong-Ill Hong, Seoul (KR); Yong-Hyun Kim, Jeollabuk-do (KR); Young-Gil Ma, Jeollabuk-do (KR); Dae-Won Kim, Jeollabuk-do (KR)

(73) Assignee: Jeongseok Chemical Corporation, Jeollabuk-do (KR)

( * ) Notice: Subject to any disclaimer, the term of this patent is extended or adjusted under 35 U.S.C. 154(b) by 466 days.

(21) Appl. No.: 17/264,709

(22) PCT Filed: Jul. 29, 2019

(86) PCT No.: PCT/KR2019/009436
§ 371 (c)(1),
(2) Date: Jan. 29, 2021

(87) PCT Pub. No.: WO2020/027530
PCT Pub. Date: Feb. 6, 2020

(65) Prior Publication Data
US 2021/0300381 A1    Sep. 30, 2021

(30) Foreign Application Priority Data
Aug. 2, 2018 (KR) .......................... 10-2018-0090329
Jun. 19, 2019 (KR) .......................... 10-2019-0072582

(51) Int. Cl.
*H04N 5/44* (2011.01)
*B60W 40/06* (2012.01)
(Continued)

(52) U.S. Cl.
CPC .......... *B60W 40/06* (2013.01); *B60W 40/105* (2013.01); *B60W 50/14* (2013.01);
(Continued)

(58) Field of Classification Search
CPC ............... B60W 50/14; B60W 60/001; B60W 2420/50; B60W 2552/53; B60W 2554/80; E01F 9/30; E01F 9/518
See application file for complete search history.

(56) References Cited

U.S. PATENT DOCUMENTS 3,668,624 A     6/1972  Spaulding
4,321,589 A  *  3/1982  King ...................... G08G 1/087
                                                340/941
(Continued)

FOREIGN PATENT DOCUMENTS

EP      198441073       7/2021
JP      S 59-165110     9/1984
(Continued)

*Primary Examiner* — Munear T Akki
(74) *Attorney, Agent, or Firm* — Wells St. John P.S.

(57) ABSTRACT

A method for generating a magnetic field, a method for detecting a lane by using a magnetic field, and a vehicle using same are disclosed. According to the present invention, magnetic fields outputted from lanes coated with road-marking paint containing magnetic particles are detected with a magnetic sensor attached to a vehicle, and a plurality of lanes can be detected on the basis of the detected magnetic fields.

16 Claims, 16 Drawing Sheets

(51) Int. Cl.
    *E01F 9/30*     (2016.01)
    *E01F 9/518*     (2016.01)
    *B60W 60/00*     (2020.01)
    *B60W 40/105*     (2012.01)
    *B60W 50/14*     (2020.01)

(52) U.S. Cl.
    CPC ............. *B60W 60/001* (2020.02); *E01F 9/30* (2016.02); *E01F 9/518* (2016.02); *B60W 2420/50* (2013.01); *B60W 2552/53* (2020.02); *B60W 2554/80* (2020.02)

(56) References Cited

U.S. PATENT DOCUMENTS

| | | | |
|---|---|---|---|
| 4,401,181 | A | 8/1983 | Schwarz |
| 6,336,064 | B1 | 1/2002 | Honkura et al. |
| 9,092,982 | B2 | 7/2015 | Robinet et al. |
| 9,278,691 | B1* | 3/2016 | Zsombory ............. G08G 1/167 |
| 9,626,570 | B2 | 4/2017 | Murao et al. |
| 9,892,296 | B2* | 2/2018 | Kovarik ............. G06K 7/10376 |
| 2003/0123930 | A1 | 7/2003 | Jacobs et al. |
| 2012/0035844 | A1 | 2/2012 | Ono |
| 2014/0365109 | A1* | 12/2014 | You ........................ G01C 21/28 701/409 |
| 2015/0183430 | A1* | 7/2015 | Schwindt .............. B60W 30/12 701/23 |
| 2016/0082957 | A1* | 3/2016 | Zsombory ............ G08G 1/0967 701/1 |
| 2018/0157878 | A1* | 6/2018 | Kovarik .................. E01F 9/578 |
| 2018/0283904 | A1* | 10/2018 | Yamamoto ............... G05D 1/02 |
| 2019/0031076 | A1* | 1/2019 | Yamamoto ............. G05D 1/021 |
| 2019/0130182 | A1* | 5/2019 | Zang .................... G06V 20/182 |
| 2019/0194886 | A1* | 6/2019 | Yamamoto ............. G08G 1/042 |
| 2019/0236942 | A1* | 8/2019 | Toshack .................. G08G 1/07 |
| 2020/0088902 | A1* | 3/2020 | Yamamoto ........... G05D 1/0259 |
| 2020/0320870 | A1* | 10/2020 | Yamamoto ........... G05D 1/0261 |
| 2021/0230821 | A1* | 7/2021 | Yamamoto ................ E01F 9/30 |

FOREIGN PATENT DOCUMENTS

| | | |
|---|---|---|
| JP | H 06-131595 | 5/1994 |
| JP | H 10-301625 | 11/1998 |
| JP | H 11-219494 | 8/1999 |
| JP | 2003-132486 | 5/2003 |
| JP | 54-33525 | 3/2014 |
| JP | 2015-066956 | 4/2015 |
| JP | 57-36387 | 6/2015 |
| KR | 10-0198125 | 6/1999 |
| KR | 10-0374923 | 3/2003 |
| KR | 10-2004-0071280 | 8/2004 |
| KR | 10-2015-0125115 | 11/2015 |
| WO | WO PCT/KR2019/009436 | 11/2019 |

\* cited by examiner

METHOD FOR GENERATING MAGNETIC FIELD, METHOD FOR DETECTING LANE BY USING MAGNETIC FIELD, AND VEHICLE USING SAME

CROSS REFERENCE TO RELATED APPLICATION

This is a 35 U.S.C. § 371 application of, and claims priority to, International Application No. PCT/KR2019/009436, which was filed on Jul. 29, 2019, and claims priority to Korean Patent Application No. 10-2019-0072582, which was filed on Jun. 19, 2019, and to Korean Patent Application No. 10-2018-0090329, which was filed on Aug. 2, 2018, the teachings of which are incorporated herein by reference.

TECHNICAL FIELD

The present invention relates generally to a method for generating a magnetic field, a method for detecting a lane using a magnetic field, and a vehicle using the same, and more particularly to technology that senses magnetic fields generated from lane lines drawn with road-marking paint containing magnetic particles, thus enabling lanes on the road to be detected.

This application claims the benefit of Korean Patent Application Nos. 10-2018-0090329, filed Aug. 2, 2018 and 10-2019-0072582 filed Jun. 19, 2019, which are hereby incorporated by reference in their entireties into this application.

BACKGROUND ART

In autonomous driving of vehicles, it is essentially required to detect lane lines painted on the road. Most autonomous vehicles detect lane lines painted on the road using optical methods. However, when a large amount of rain blurs a visual field, when snow is piled up on the road, or when it is difficult to secure a clear view at night, it is difficult to optically identify lane lines, thus causing a serious problem in autonomous driving.

Recently, in order to solve this problem, a method for laying magnetic markers in the road and detecting lane lines using a magnetic sensor attached to a vehicle has been proposed. However, this technology is problematic in that it is inefficient because expensive permanent magnets must be laid at the centers of all roads.

DISCLOSURE

Technical Problem

An object of the present invention is to provide a method that is capable of detecting lane lines by identifying the types of lane lines painted on the road based on a magnetic sensor.

Another object of the present invention is to provide a method that is capable of detecting lane lines without being influenced by weather conditions or visibility, thus preventing a critical accident that may occur when lane lines are detected using other methods.

A further object of the present invention is to provide a method that is capable of accurately measuring the speed of a vehicle without being influenced by weather conditions or visibility using a magnetic sensor attached to the vehicle.

Yet another object of the present invention is to more accurately calculate the location or speed of a vehicle by excluding the influence of various types of noise that may occur on the road.

Technical Solution

A lane detection method to accomplish the above objects may include sensing magnetic fields corresponding to magnetic particles included in multiple lane lines based on a magnetic sensor attached to a vehicle; and detecting multiple lane lines based on the magnetic fields.

Here, the lane detection method may further include classifying types of the multiple lane lines based on the magnetic fields.

Here, the classifying may be configured to classify the types of the multiple lane lines based on any one of a magnetic field intensity corresponding to each of the lane lines and a change in a magnetic field attributable to a magnetization pattern.

Here, the lane detection method may further include generating information about a distance between at least one of the multiple lane lines and the vehicle based on the magnetic fields and generating information about an on-road location of the vehicle on a road using the distance information; and generating at least one of a driving control signal for the vehicle and an alert notification for a driver based on the on-road location information.

Here, the lane detection method may further include setting a magnetic field correction interval in which a rate of change in the magnetic field intensity is equal to or greater than a preset reference change rate, for each of the sensed magnetic fields; and correcting data corresponding to the magnetic field correction interval.

Here, setting the magnetic field correction interval may be configured to set the magnetic field correction interval in consideration of vehicle sensor data, corresponding to the interval in which the rate of change in the magnetic field intensity is equal to or greater than the preset reference change rate.

Here, the lane detection method may further include sensing a magnetic field generated from magnetic particles included in each lane line based on the magnetic sensor; and calculating a speed of the vehicle using an alternating magnetic pattern of the lane line and the sensed magnetic field.

Here, the calculating may be configured to calculate the speed of the vehicle based on a ratio of a second frequency corresponding to a frequency of the sensed magnetic field to a first frequency corresponding to a frequency of the alternating magnetic pattern.

Here, the lane detection method may further include determining, based on a speed limit of the road and the speed of the vehicle, whether the vehicle is traveling at an excessive speed; and if it is determined that the vehicle is traveling at an excessive speed, providing an alarm to a driver of the vehicle or providing feedback causing a control module of the vehicle to reduce the speed.

Here, the magnetic sensor may be a composite sensor in which a high-sensitivity sensor and a low-sensitivity sensor are combined with each other.

Here, the magnetic sensor may be configured to generate pieces of sensing information for respective sensing sensitivity levels by combining a result of sensing by the high-sensitivity sensor with a result of sensing by the low-sensitivity sensor.

Here, generating the on-road location information may be configured to acquire magnetic field sensing signals, obtained by sensing the magnetic fields from left and right portions of the vehicle based on magnetic sensor units constituting the magnetic sensor, and to generate the distance information using a difference between signal strengths of the magnetic field sensing signals.

Here, each of the magnetic sensor units may sense the magnetic fields from at least one of left/right, front, middle, and back portions of the vehicle.

Here, the lane detection method may further include generating inter-vehicle information including at least one of a location of an additional vehicle located near the vehicle and a distance between the vehicle and the additional vehicle based on a degree of distortion of the magnetic fields attributable to the additional vehicle.

Further, a magnetic field generation method according to an embodiment of the present invention is a magnetic field generation method using road-marking paint, and may include applying the road-marking paint onto a road so as to indicate a lane line; and outputting a magnetic field sensed by a vehicle to which a magnetic sensor is attached, in accordance with magnetic particles included in the road-marking paint.

Here, the magnetic particles may be configured such that any one of an addition concentration, a magnetization pattern, and a remanent magnetization property is set differently depending on a type of each lane line.

Here, the magnetic field generation method may further include generating an alternating magnetic field corresponding to an alternating magnetic pattern to be applied to the lane line based on a rotation angle of a wheel of a construction device that applies the road-marking paint onto the road; and applying the generated alternating magnetic field to the magnetic particles.

Here, the generating may be configured to calculate a number of magnetic field alternations for maintaining the alternating magnetic pattern on a lane line constructed while the construction device is moved in accordance with the rotation angle of the wheel, and to generate an alternating magnetic field corresponding to the calculated number of magnetic field alternations.

Furthermore, a vehicle according to an embodiment of the present invention may include a magnetic sensor for sensing magnetic fields corresponding to magnetic particles included in multiple lane lines; and a processor for detecting multiple lane lines based on the magnetic fields.

Here, the processor may classify types of the multiple lane lines based on the magnetic fields.

Here, the processor may be configured to classify the types of the multiple lane lines based on any one of a magnetic field intensity corresponding to each of the lane lines and a change in a magnetic field attributable to a magnetization pattern.

Here, the processor may be configured to generate information about a distance between at least one of the multiple lane lines and the vehicle based on the magnetic fields and to generate at least one of a driving control signal for the vehicle and an alert notification for a driver based on on-road location information generated using the distance information.

Here, the processor may be configured to set a magnetic field correction interval in which a rate of change in the magnetic field intensity is equal to or greater than a preset reference change rate, for each of the sensed magnetic fields, and to correct data corresponding to the magnetic field correction interval.

Here, the processor may be configured to set the magnetic field correction interval in consideration of vehicle sensor data, corresponding to the interval in which the rate of change in the magnetic field intensity is equal to or greater than the preset reference change rate.

Here, the processor may be sense a magnetic field generated from magnetic particles included in each lane line based on the magnetic sensor, and calculate a speed of the vehicle using an alternating magnetic pattern of the lane line and the sensed magnetic field.

Here, the speed of the vehicle may be calculated based on a ratio of a second frequency corresponding to a frequency of the sensed magnetic field to a first frequency corresponding to a frequency of the alternating magnetic pattern.

Here, based on a speed limit of the road and the speed of the vehicle, whether the vehicle is traveling at an excessive speed may be determined, and if it is determined that the vehicle is traveling at an excessive speed, an alarm may be provided to a driver of the vehicle or feedback may be provided to cause a control module of the vehicle to reduce the speed.

Here, the magnetic sensor may be a composite sensor in which a high-sensitivity sensor and a low-sensitivity sensor are combined with each other.

Here, the magnetic sensor may be configured to generate pieces of sensing information for respective sensing sensitivity levels by combining a result of sensing by the high-sensitivity sensor with a result of sensing by the low-sensitivity sensor.

Here, the processor may be configured to acquire magnetic field sensing signals, obtained by sensing the magnetic fields from left and right portions of the vehicle based on magnetic sensor units constituting the magnetic sensor, and to generate the distance information using a difference between signal strengths of the magnetic field sensing signals.

Here, each of the magnetic sensor units may sense the magnetic fields from at least one of left/right, front, middle, and back portions of the vehicle.

Here, the processor may be configured to generate inter-vehicle information including at least one of a location of an additional vehicle located near the vehicle and a distance between the vehicle and the additional vehicle based on a degree of distortion of the magnetic fields attributable to the additional vehicle.

Here, the magnetic field intensity may be designated to be identified based on any one of addition concentration and a remanent magnetization property of the magnetic particles.

Advantageous Effects

In accordance with the present invention, there can be provided a method that is capable of detecting lane lines by identifying the types of lane lines painted on the road based on a magnetic sensor.

Further, the present invention may provide a method that is capable of detecting lane lines without being influenced by weather conditions or visibility, thus preventing a critical accident that may occur when lane lines are detected using other methods.

Furthermore the present invention may provide a method that is capable of accurately measuring the speed of a vehicle without being influenced by weather conditions or visibility based on a magnetic sensor attached to the vehicle.

Furthermore, the present invention may more accurately calculate the location or speed of a vehicle by excluding the influence of various types of noise that may occur on the road.

BEST MODE

Figure 1:
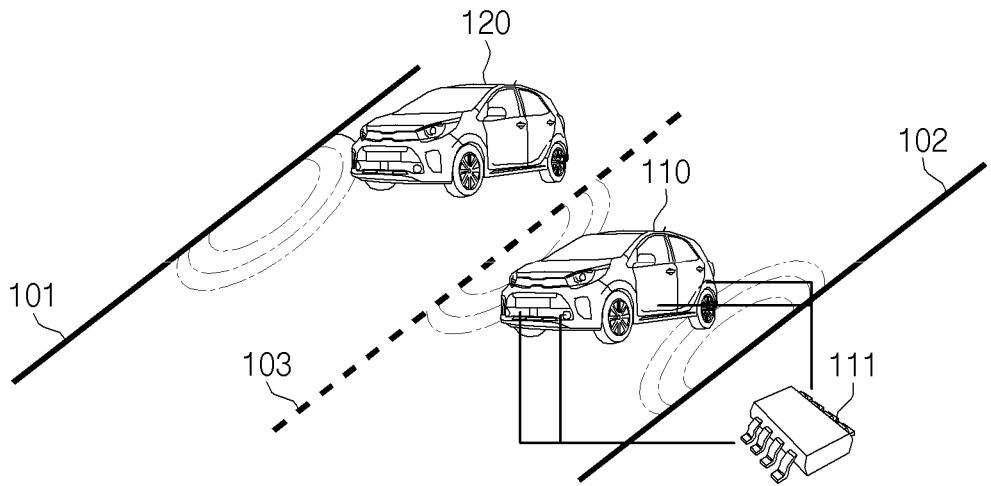
FIG. 1 is a diagram illustrating a lane detection system according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, preferred embodiments of the present invention will be described in detail with reference to the attached drawings.

FIG. 1 is a diagram illustrating a lane detection system according to an embodiment of the present invention.

Referring to FIG. 1, the lane detection system according to the embodiment of the present invention includes multiple lane lines 101 to 103 containing magnetic particles, and a vehicle 110 equipped with a magnetic sensor 111 attached thereto.

Generally, the term "lane line" denotes a solid line or a dotted line, formed by applying paint such as white, yellow or blue paint on the road so as to guide the travel of the vehicle. Based on various types of such lane lines, the travel direction of the vehicle is indicated on the road, thus preventing a traffic accident from occurring, but there may occasionally occur the case where a driver drives a vehicle while ignoring lane lines due to the carelessness of the driver.

Therefore, in the past, in order to this problem, technologies for detecting lane lines painted on the road using various types of sensors installed on a vehicle and providing a warning to a driver based on information about the detected lane lines or controlling the travel of the vehicle have been developed.

However, since most conventional technologies use optical methods, it is difficult to accurately identify lane lines when it rains, when snow is piled up on the road, or when it is difficult to secure a clear view, such as at night, thus causing an accident.

Therefore, the present invention is intended to provide technology that additionally measures the speed of a vehicle while detecting the locations and types of lane lines based on magnetic fields output from the lane lines through magnetic particles, thus allowing the vehicle to travel more accurately and safely.

First, as illustrated in FIG. 1, the multiple lane lines 101 to 103 painted on the road according to the embodiment of the present invention may be drawn with road-marking paint containing magnetic particles, and may output magnetic fields sensed by the magnetic sensor 111 attached to the vehicle 110.

Below, a process for detecting lane lines according to an embodiment of the present invention will be described based on the vehicle 110 illustrated in FIG. 1.

First, the multiple lane lines 101 to 103 may be lines applied with road-marking paint containing magnetic particles. Therefore, the multiple lane lines 101 to 103 may output respective magnetic fields, and the vehicle 110 may sense the magnetic fields output in this way based on the magnetic sensor 111.

Here, the vehicle 110 may simultaneously or sequentially sense the magnetic fields output from the multiple lane lines 101 to 103.

Here, the magnetic sensor 111 may be a composite sensor in which a high-sensitivity sensor and a low-sensitivity sensor are combined with each other. Therefore, the magnetic sensor 1110 may generate pieces of sensing information for respective sensing sensitivity levels by combining high-sensitivity sensing results and low-sensitivity sensing results for the magnetic fields, output from the multiple lane lines 101 to 103, with each other, and may provide the pieces of sensing information for respective sensing sensitivity levels.

Here, the vehicle 110 may classify the types of multiple lane lines 101 to 103 based on the magnetic fields sensed by the magnetic sensor 111. For example, for each of the multiple lane lines 101 to 103, whether the corresponding lane line is a lane line allowing or disallowing a lane change may be identified.

Here, the type of each of the multiple lane lines 101 to 103 may be classified based on any one of a magnetic field intensity corresponding to each of the multiple lane lines 101 to 103 and a change in a magnetic field attributable to a magnetization pattern.

Here, lane lines corresponding to magnetic fields which are different from each other in at least one of sensing information for respective sensing sensitivity levels, in which a magnetic field intensity is taken into consideration, and a magnetic field magnetization pattern, may be identified as different types of lane lines.

Here, the pieces of sensing information for respective sensing sensitivity levels may be generated by combining the sensing results obtained by the high-sensitivity sensor and the low-sensitivity sensor, corresponding to the magnetic sensor 111, with each other.

Here, the magnetic field intensity may change in accordance with any one of addition concentration and the remanent magnetization property of magnetic fields contained in the road-marking paint used to draw the multiple lane lines 101 to 103.

Here, the magnetization pattern of each magnetic field may correspond to the magnetic moment direction of magnetic particles aligned by an external magnetic field during a procedure of painting the multiple lane lines 101 to 103.

Further, the vehicle 110 may generate information about the distance between at least one of the multiple lane lines 101 to 103 and the vehicle 110 based on the magnetic fields sensed by the magnetic sensor 111, and may generate information about the location of the vehicle 110 on the road using the distance information.

In this case, based on magnetic sensor units constituting the magnetic sensor 111, magnetic field sensing signals obtained by sensing magnetic fields from the left and right portion of the vehicle 110 may be acquired, and the distance information may be generated using the difference between the strengths of the magnetic field sensing signals.

Here, each of the magnetic sensor units may sense magnetic fields at any one of the left/right, front, middle, and back portions of the vehicle 110.

Furthermore, the vehicle 110 may generate at least one of a driving control signal for the vehicle 110 and an alert notification for the driver based on the on-road location information.

For example, when it is determined that the vehicle 110 is approaching a lane line 102 disallowing a lane change based on the on-road location information, a driving control signal may be generated such that the vehicle 110 can move to the center of the road between lane lines. Alternatively, the driver is prompted to recognize that the vehicle 110 is approaching the lane line 102 through an alert notification, thus reducing the possibility of occurrence of an accident.

Further, the vehicle 110 may generate inter-vehicle information including at least one of the location of an additional vehicle 120 traveling near the vehicle 110 and the distance between the vehicle 110 and the additional vehicle 120 based on the degree of distortion of the magnetic fields attributable to the additional vehicle 120.

For example, the vehicle 110 and the additional vehicle 120 may include magnets or parts that may distort magnetic fields in the left/right, front, middle, and back portions of a vehicle body in a vehicle manufacturing process. Since the magnets or parts included in the vehicle body may generate a magnetic field stronger than a geomagnetic field, they may distort the magnetic fields output from the multiple lane lines 101 to 103. Alternatively, because the bodies of the vehicle 110 and the additional vehicle 120 are made of steel, they may distort the magnetic fields output from the multiple lane lines 101 to 103 even if parts for distorting magnetic fields are not separately included in the vehicle bodies.

Therefore, the vehicle 110 may set a magnetic field correction interval in which the rate of change in the corresponding magnetic field intensity is equal to or greater than a preset reference change rate, for each of the magnetic fields sensed through the magnetic sensor 111, and may correct data corresponding to the magnetic field correction interval. Through this process, the influence of external noise that distorts magnetic fields output from the multiple lane lines 101 to 103 may be removed.

Here, the magnetic field correction interval may be set in consideration of vehicle sensor data corresponding to the interval in which the rate of change in a magnetic field intensity is equal to or greater than the preset reference change rate.

Here, the vehicle sensor data may correspond to a weighted average of the pieces of data measured by two or more of an acceleration sensor, a Global Positioning System (GPS) sensor, a speed sensor, a steering wheel sensor, and an accelerator sensor. That is, two or more sensors for generating vehicle sensor data may be provided on the vehicle 110.

Further, the vehicle 110 may calculate the speed using an alternating magnetic pattern corresponding to the lane lines 102 and 103 and the magnetic fields sensed by the magnetic sensor 111.

Here, the speed of the vehicle 110 may be calculated based on the ratio of a second frequency, corresponding to the frequency of a magnetic field sensed by the magnetic sensor 111, to a first frequency, corresponding to the frequency of the alternating magnetic pattern.

Here, when the second frequency sensed through the magnetic sensor 111 is not uniform, a frequency-setting interval, in which the rate of change in the frequency is less than or equal to a preset reference value, of the entire period of the second frequency, may be detected, and the speed of the vehicle 110 may be calculated using the second frequency corresponding to the frequency-setting interval.

Each magnetic field output in this way has an alternating magnetic pattern at a uniform frequency, and may be produced by applying the alternating magnetic field to magnetic particles contained in road-marking paint.

Here, the alternating magnetic field applied to the magnetic particles may be generated in accordance with an alternating magnetic pattern to be applied to the multiple lane lines 101 to 103 based on the rotation angle of the wheel of a construction device for applying road-marking paint onto the road.

Here, while the construction device is moving in accordance with the rotation angle of the wheel, the number of magnetic field alternations for maintaining the alternating magnetic pattern on the constructed lane line may be calculated, and the alternating magnetic field corresponding to the calculated number of magnetic field alternations may be generated.

Further, the vehicle 110 may determine whether the vehicle is traveling at an excessive speed based on the speed limit of the road and the speed measured as described above, and may provide an alarm to the driver of the vehicle 110 or provide feedback causing the control module of the vehicle 110 to reduce the speed if it is determined that the vehicle is traveling at an excessive speed.

The use of such a lane detection system may greatly reduce an error that may occur when the lane lines are detected or when the speed is measured, and may help a driver or a user who uses an autonomous vehicle provide a safer driving environment.

Figure 2:
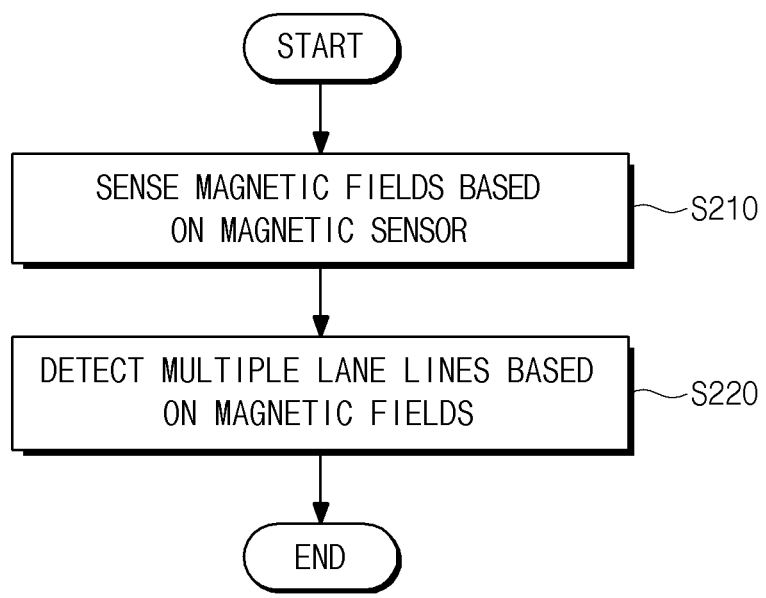
FIG. 2 is an operation flowchart illustrating a lane detection method using a magnetic field according to an embodiment of the present invention.

FIG. 2 is an operation flowchart illustrating a lane detection method using a magnetic field according to an embodiment of the present invention.

Referring to FIG. 2, the lane detection method using a magnetic field according to the embodiment of the present invention senses magnetic fields corresponding to magnetic particles contained in multiple lane lines based on a magnetic sensor attached to a vehicle at step S210.

Here, the multiple lane lines may be applied onto the road using road-marking paint containing magnetic particles. Therefore, magnetic fields corresponding to respective lane lines may be output from multiple lane lines painted on the road, and the present invention provides a method for allowing the vehicle to detect lane lines using the magnetic fields.

Here, the magnetic sensor may be a composite sensor in which a high-sensitivity sensor and a low-sensitivity sensor are combined with each other.

Therefore, the magnetic sensor may generate pieces of sensing information for respective sensing sensitivity levels by combining sensing results obtained by the high-sensitivity sensor with sensing results obtained by the low-sensitivity sensor for the magnetic fields corresponding to magnetic particles contained in the multiple lane lines.

For example, it may be assumed that lane line A, indicated by a solid line, and lane line B, indicated by a dotted line, are respectively located on both sides of the road on which the vehicle is traveling. Here, the magnetic sensor attached to the vehicle may generate magnetic field sensing results for lane line A by combining high-sensitivity sensing results and low-sensitivity sensing results for a magnetic field output from lane line A, and may generate magnetic field sensing results for lane line B by combining high-sensitivity sensing results and low-sensitivity sensing results for a magnetic field output from lane line B. When a magnetic field is sensed only by the high-sensitivity sensor and is not sensed by the low-sensitivity sensor, the magnetic field sensing results may be generated using only the high-sensitivity sensing results.

Further, the lane detection method using a magnetic field according to the embodiment of the present invention detects multiple lane lines based on the magnetic fields at step S220.

Here, the multiple lane lines may be simultaneously or sequentially detected based on the magnetic fields.

In an example, when multiple lane lines are sequentially detected, they may be sequentially detected in the order of intensity of an output magnetic field from the lane line having the largest magnetic field intensity to the lane line having the smallest magnetic field intensity. In another example, a specific type of lane line may be detected first depending on the types of multiple lane lines.

Here, the present invention is not limited to any one of a scheme for simultaneously detecting multiple lane lines and a scheme for sequentially detecting multiple lane lines, and may detect multiple lane lines using various schemes in addition to the above schemes.

Here, the types of multiple lane lines may be classified based on the magnetic fields.

For example, various types of lane lines related to traffic rules may be classified into a dotted lane line that allows a lane change, a solid lane line or double lane line that disallows a lane change, and a zigzag lane line that causes the speed of a vehicle to be reduced.

Here, the types of multiple lane lines may be classified based on any one of the magnetic field intensity corresponding to each of the lane lines and change in the magnetic field attributable to a magnetization pattern.

Figure 3:
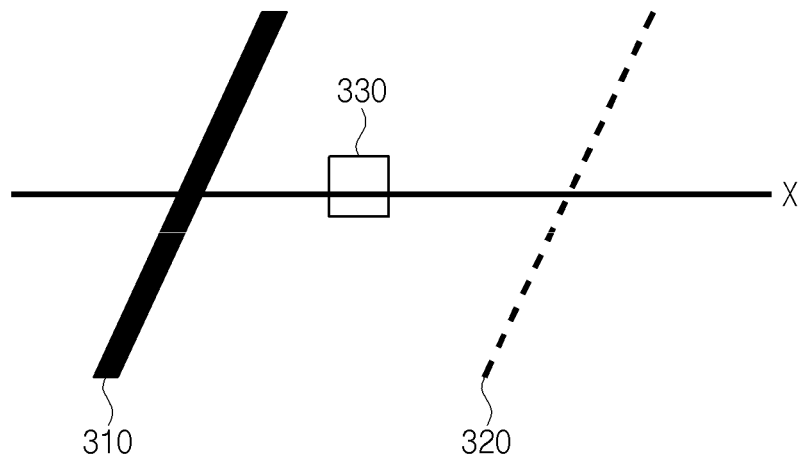
FIGS. 3 and 4 are diagrams illustrating an example in which the types of lane lines are distinguished using the intensity of a magnetic field according to the present invention.

For example, as illustrated in FIG. 3, it may be assumed that there are a lane line 310 which is a solid line and a lane line 320 which is a dotted line on the road, and that a vehicle is traveling between the two lane lines 310 and 320. Here, when a magnetic field output from the lane line 310 which is a solid line is greater than the magnetic field output from the lane line 320 which is a dotted line, the low-sensitivity sensor of the magnetic sensor 330 attached to the vehicle may sense only the magnetic field output from the lane line 310 which is a solid line. That is, the pieces of sensing information for respective sensing sensitivity levels for the magnetic field output from the lane line 310 which is a solid line include both high-sensitivity sensing information and low-sensitivity sensing information, but the pieces of sensing information for respective sensing sensitivity levels for the magnetic field output from the lane line 320 which is a dotted line include only high-sensitivity sensing information.

Therefore, since pieces of sensing information for respective sensing sensitivity levels of the magnetic fields output from the lane line 310 which is a solid line and the magnetic field output from the lane line 320 which is a dotted line are different from each other, the vehicle may recognize that the two lane lines 310 and 320 are different types of lane lines.

Here, the pieces of magnetic field characteristic information for respective types of lane lines may be stored and managed in separate memory provided in the vehicle, and the magnetic field output from the lane line 310 which is a solid line and the magnetic field output from the lane line 320 which is a dotted line are respectively compared with the pieces of magnetic field characteristic information for respective types of lane lines, and thus the type of the corresponding lane line may be determined.

Figure 4:
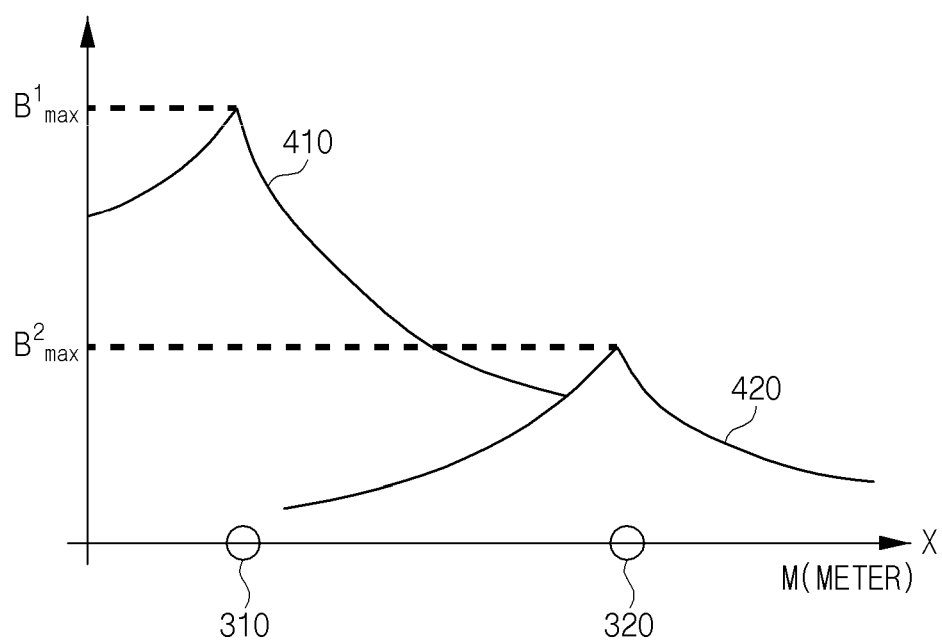

In this case, the X axis of a graph illustrated in FIG. 4 may denote values obtained by representing the location of the magnetic sensor 330, illustrated in FIG. 3, in meters, and the Y axis thereof may denote a magnetic flux density or a magnetic field intensity which is the intensity of a magnetic field. Therefore, as in the case of the above example, when the intensity of the magnetic field output from the lane line 310 which is a solid line is greater than that of the magnetic field output from the lane line 320 which is a dotted line, a magnetic field sensing signal 410 for the lane line 310 which is a solid line may be distributed to generally have values greater than those of a magnetic field sensing signal 420 for the lane line 320 which is a dotted line.

In this case, the magnetic field intensity may be designated to be identified in accordance with any one of addition concentration and remanent magnetization property of magnetic particles.

In an example, assuming that the lane line 310 which is a solid line and the lane line 320 which is a dotted line, as illustrated in FIG. 3, contain the same type of magnetic particles, the intensities of magnetic fields output from the two lane lines 310 and 320 may be distinguished from each other by adding more magnetic particles to road-marking paint for drawing the lane line 310 which is a solid line than the magnetic particles of the road-marking paint for drawing the lane line 320 which is a dotted line.

In another example, assuming that magnetic particles having different remanent magnetization properties are added to the lane line 310 which is a solid line and the lane line 320 which is a dotted line, as illustrated in FIG. 3, the intensities of magnetic fields output from the two lane lines 310 and 320 may be distinguished from each other by adding magnetic particles having greater remanent magnetization properties to the lane line 310 which is a solid line than those of the lane line 320 which is a dotted line.

Figure 5:
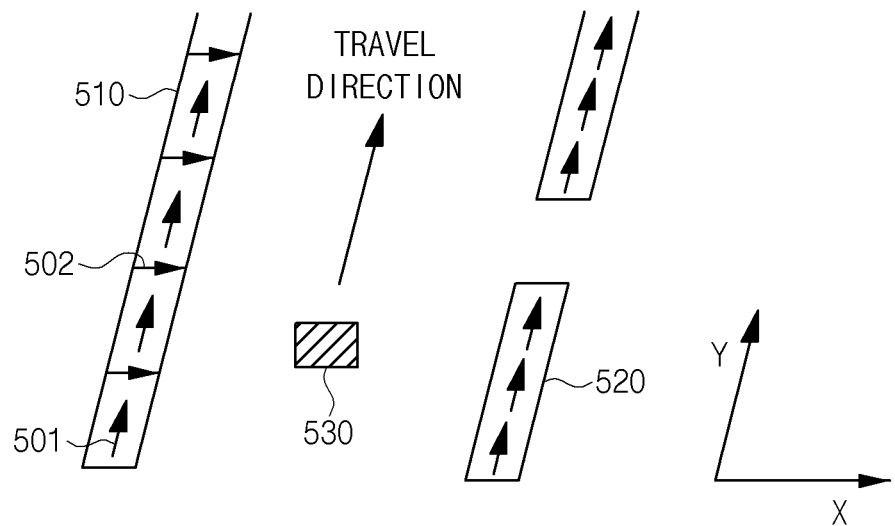
FIGS. 5 to 7 are diagrams illustrating an example in which the types of lane lines are distinguished using a magnetic field pattern according to the present invention.

Further, the present invention may also classify the types of lane lines by artificially forming a magnetization pattern for magnetic particles contained in lane lines 510 and 520, as illustrated in FIG. 5.

Here, the magnetization pattern may be set based on the magnetic moment directions 501 and 502 of magnetic particles aligned by an external magnetic field when road-marking paint for drawing multiple lane lines is applied.

That is, as illustrated in FIG. 5, the lane line 510 may be magnetized such that when road-marking paint for drawing the lane line 510 is applied onto the road, the magnetic moment direction of magnetic particles corresponds to an alternating pattern, and the lane line 520 may be magnetized such that when road-marking paint for drawing the lane line 520 is applied onto the road, the magnetic moment direction of magnetic particles corresponds to a Y direction. Here, the magnetic particles may be aligned using a DC magnetic field or an alternating current (AC) magnetic field.

Therefore, a magnetic sensor 530 attached to the vehicle traveling between the two lane lines 530 may sense different respective magnetic field magnetization patterns for two lane lines 510 and 210. The types of respective lane lines 510 and 520 detected by the vehicle may be classified using the different magnetic field magnetization patterns sensed in this way.

Figure 6:
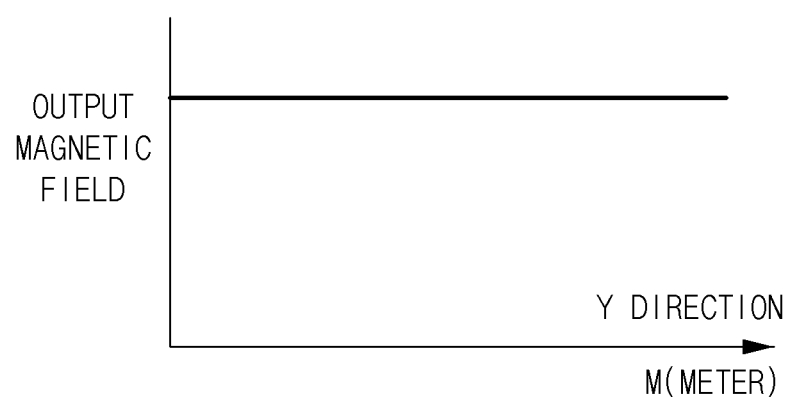

That is, as illustrated in FIG. 5, assuming that a magnetic moment direction 501 is Y and a magnetic moment direction 502 is X, the magnetization pattern of a magnetic field output from the lane line 510 magnetized in accordance with an alternating pattern may be sensed, as illustrated in FIG. 6. Further, the magnetization pattern of a magnetic field output from the lane line 520 magnetized in accordance with the Y direction may be sensed, as illustrated in FIG. 7.

Figure 7:
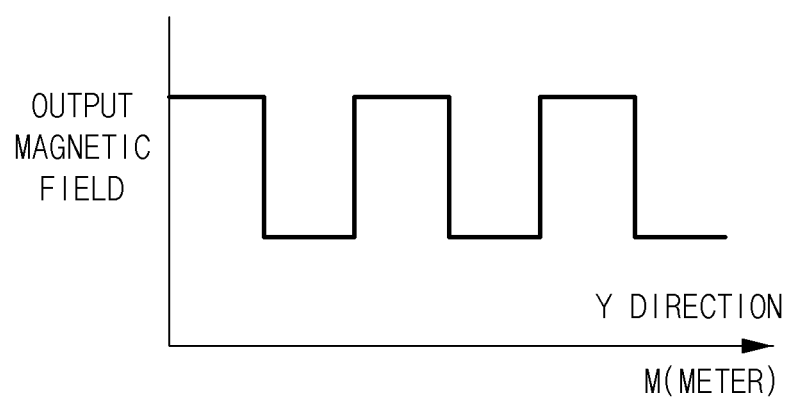

Therefore, the vehicle to which the magnetic sensor 530 is attached may recognize that the two lane lines 510 and 520 are different types of lane lines through the difference between the magnetization patterns, such as those in FIGS. 6 and 7.

Here, the magnetic field magnetization patterns for multiple lane lines may be set in various manners, without being limited to the patterns shown in FIGS. 5 to 7.

Here, information about the magnetic field magnetization patterns for respective types of lane lines may be stored and managed in separate memory provided in the vehicle, and the magnetization pattern of a magnetic field, which is sensed by the magnetic sensor, is compared with the pieces of magnetic field magnetization pattern information for respective types of lane lines, and thus the type of the corresponding lane line may be determined.

Further, although not illustrated in FIG. 2, the lane detection method using a magnetic field according to the embodiment of the present invention generates information about the distance between at least one of multiple lane lines and the vehicle based on magnetic fields, and generates information about the location of the vehicle on the road using the distance information.

Here, based on the magnetic sensor units constituting the magnetic sensor, magnetic field sensing signals obtained by sensing magnetic fields from the left and right portions of the vehicle may be acquired, and the distance information may be generated using the difference between the strengths of the magnetic field sensing signals.

Figure 9:
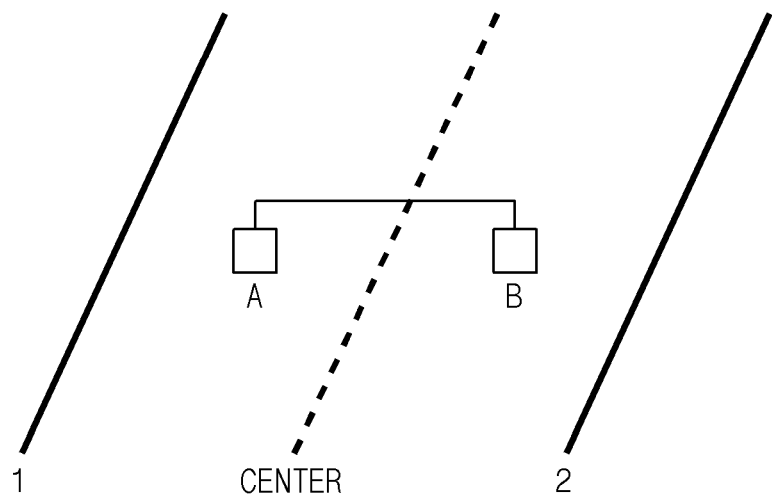
FIGS. 9 to 12 are diagrams illustrating an example of a process in which information about the location of a vehicle on a road is generated according to the present invention.

For example, referring to FIG. 9, it may be assumed that magnetic sensor unit A and magnetic sensor unit B are attached to the left and right portions of a vehicle and that the magnetic field of lane line 1 is sensed by magnetic sensor unit A and the magnetic field of lane line 2 is sensed by magnetic sensor unit B.

Figure 10:
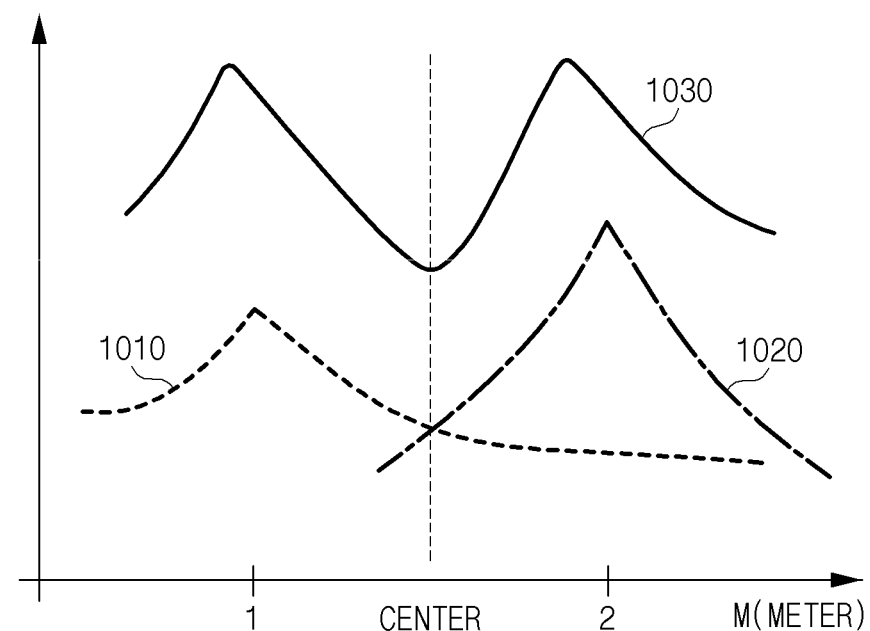

Here, when magnetic field sensing signals sensed by the two magnetic sensor units correspond to a magnetic field sensing signal A 1010 and a magnetic field sensing signal B 1020, respectively, as illustrated in FIG. 10, a graph 103 for the difference between the strengths of the magnetic field sensing signals, such as that illustrated in FIG. 10, may be derived.

Here, the magnetic field sensing signal A 1010 is the result of sensing the magnetic field from lane line 1 by magnetic sensor unit A with the movement of the vehicle to the left/right sides of the road, and the magnetic field sensing signal B 1020 is the result of sensing the magnetic field from lane line 2 by magnetic sensor unit B with the movement of the vehicle to the left/right sides of the road. Also, the signal strength difference graph 1030 may correspond to the result of calculating the differences between the strengths of the magnetic field sensing signal A 1010 and the magnetic field sensing signal B 1020 for respective left/right locations of the road and representing the absolute values of the differences.

Figure 11:
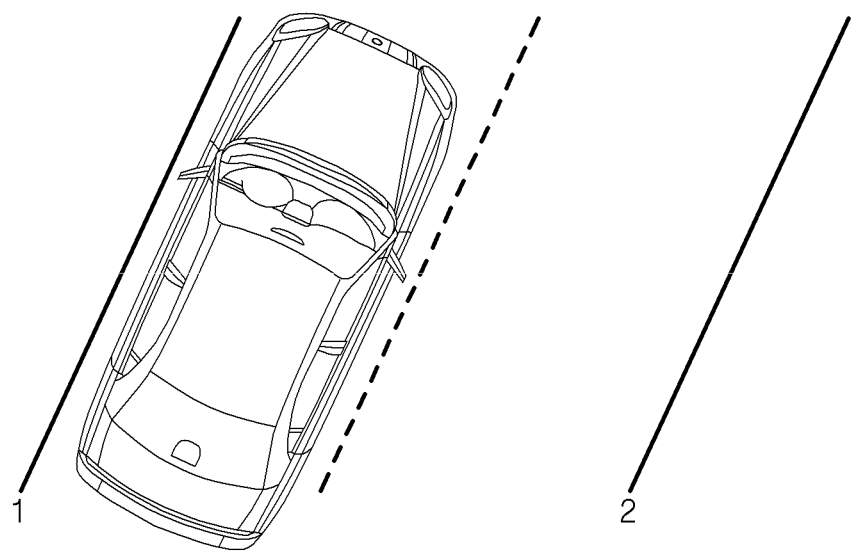
Figure 12:
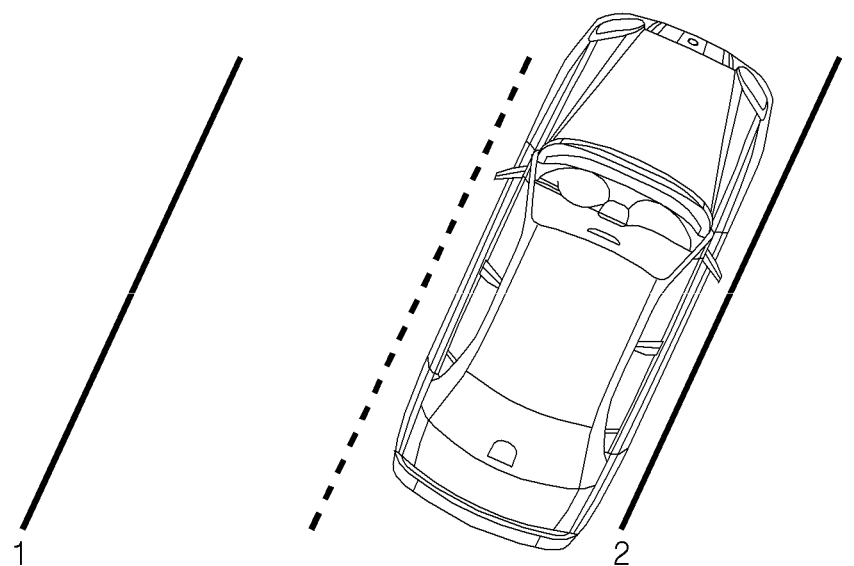

Here, it can be seen that, when the vehicle is located at the center between the two lane lines, the difference between the signal strengths sensed from the respective lane lines by the two magnetic sensor units located in the left and right portions of the vehicle may be a minimum value. That is, when the vehicle deviates from the center of the lane between lane lines and approaches lane line 1, as illustrated in FIG. 11, the magnetic field sensing signal A 1010 increases, and then the values of the signal strength difference graph 1030 also increase, and even if the vehicle deviates from the center of the lane and approaches lane line 2, as illustrated in FIG. 12, the magnetic field sensing signal B 1020 increases, and then the values of the signal strength difference graph 1030 also increase.

Therefore, information about the distance between at least one of the multiple lane lines and the vehicle may be calculated based on the difference between the signal strengths of the magnetic field sensing signals sensed from the left and right portions of the vehicle, and information about the location of the vehicle on the road may be generated using the distance information.

In an example, referring to FIGS. 3 and 4, when the magnetic sensor 330 is located over any one of the two lane lines 310 and 320, the magnetic sensor 330 may sense the maximum output value of a magnetic field output from the corresponding lane line. That is, as illustrated in FIG. 4, $B^1max$, which is sensed when the magnetic sensor 330 is located over the lane line 310 which is a solid line, may correspond to the maximum output magnetic field value of the lane line 310 which is a solid line, and $B^2max$, which is sensed when the magnetic sensor 330 is located over the lane line 320 which is a dotted line, may correspond to the maximum output magnetic field value of the lane line 320 which is a dotted line.

In this way, when the maximum output magnetic field of any one of multiple lane lines is sensed through the magnetic sensor, it may be determined that the vehicle is located over the lane line corresponding to the maximum output magnetic field, and information about the location of the vehicle on the road depending on the determination may be generated.

Here, the magnetic sensor units constituting the magnetic sensor according to the embodiment of the present invention may sense magnetic fields in at least one of the left/right, front, middle, and back portion of the vehicle.

Figure 8:
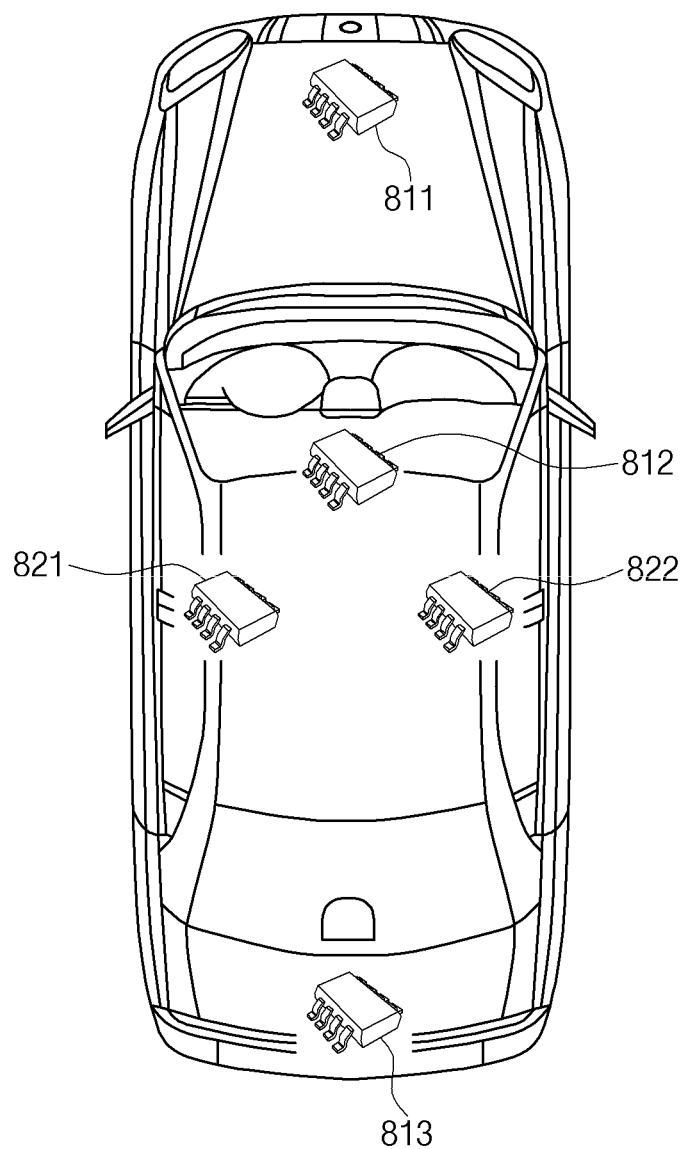
FIG. 8 is a diagram illustrating an example of a magnetic sensor attached to a vehicle according to the present invention.

For example, referring to FIG. 8, the magnetic sensor according to the embodiment of the present invention may include multiple magnetic sensor units 811 to 813, 821 and 822 respectively attached to the left/right, front, middle, and back portions of the vehicle.

The magnetic sensor may provide information required to generate the on-road location information of the vehicle by mathematically processing magnetic fields sensed through the multiple magnetic sensor units 811 to 813, 821, and 822.

In this case, the locations or the numbers of the magnetic sensor units 811 to 813, 821, and 822 of FIG. 8 attached to the vehicle are only examples, and are not limited to those illustrated in FIG. 8.

Further, although not illustrated in FIG. 2, the lane detection method using a magnetic field according to an embodiment of the present invention generates at least one of a driving control signal for the vehicle and an alert notification for the driver based on the on-road location information.

For example, when it is determined that the vehicle is approaching a lane line disallowing a lane change based on the on-road location information, a driving control signal may be generated so that the vehicle can move to the center of the road between lane lines. Alternatively, the possibility of occurrence of an accident may be reduced by prompting the driver to recognize that the vehicle is approaching a specific lane line through the alert notification for the driver.

Further, although not illustrated in FIG. 2, the lane detection method using a magnetic field according to the embodiment of the present invention may generate inter-vehicle information including at least one of the location of an additional vehicle traveling near the corresponding vehicle and the distance between the vehicle and the additional vehicle, based on the degree of distortion of the magnetic fields attributable to the additional vehicle.

For example, the vehicle 110 illustrated in FIG. 1 may recognize a phenomenon in which magnetic fields output from the multiple lane lines 101 to 103 are distorted by the additional vehicle 120 traveling in another lane, and may generate inter-vehicle information between the vehicle 110 and the additional vehicle 120 in consideration of the degree to which the magnetic fields are distorted or the extent to which the magnetic fields are distorted. Here, the inter-vehicle information may include information corresponding to at least one of the location of the additional vehicle 120 relative to the vehicle 110 and the distance between the vehicle 110 and the additional vehicle 120.

Here, the inter-vehicle information may be used in combination with information about the locations and types of multiple lane lines 101 to 103 sensed by the vehicle 110. For example, the combined information may also be used as information for detecting surroundings during the travel of the vehicle 110.

For example, when the vehicle 110 illustrated in FIG. 1 attempts to change lanes in the direction of the lane line 103, whether such a lane change is to be allowed in a safe situation may be determined based on the inter-vehicle information with the additional vehicle 120. If it is determined that the vehicle 110 attempts to change a lane in the state in which a safe distance to the additional vehicle 120 is not maintained, driving may be controlled to prevent the lane change, or alternatively, an alert notification may be generated.

Further, although not illustrated in FIG. 2, the lane detection method according to an embodiment of the present invention may set a magnetic field correction interval in which the rate of change in the corresponding magnetic field intensity is equal to or greater than a preset reference change rate, for each of the sensed magnetic fields, and may correct data corresponding to the magnetic field correction interval.

Here, the interval in which the range of change in the magnetic field intensity is equal to or greater than the preset reference change rate may literally mean the interval in which the intensity of the magnetic field changes sharply. That is, the magnetic sensor of the vehicle may be influenced by various factors, such as an additional vehicle on the road or an object installed on the road, in addition to magnetic fields generated from magnetic particles contained in lane lines. Therefore, the present invention may set the magnetic field correction interval so as to eliminate noise attributable to such various factors, and may correct the data corresponding to the corresponding interval.

Here, the preset reference change rate is set to a value suitable for the elimination of noise, but the setting thereof may be freely changed depending on the sensitivity of the magnetic sensor or the external environment.

Figure 13:
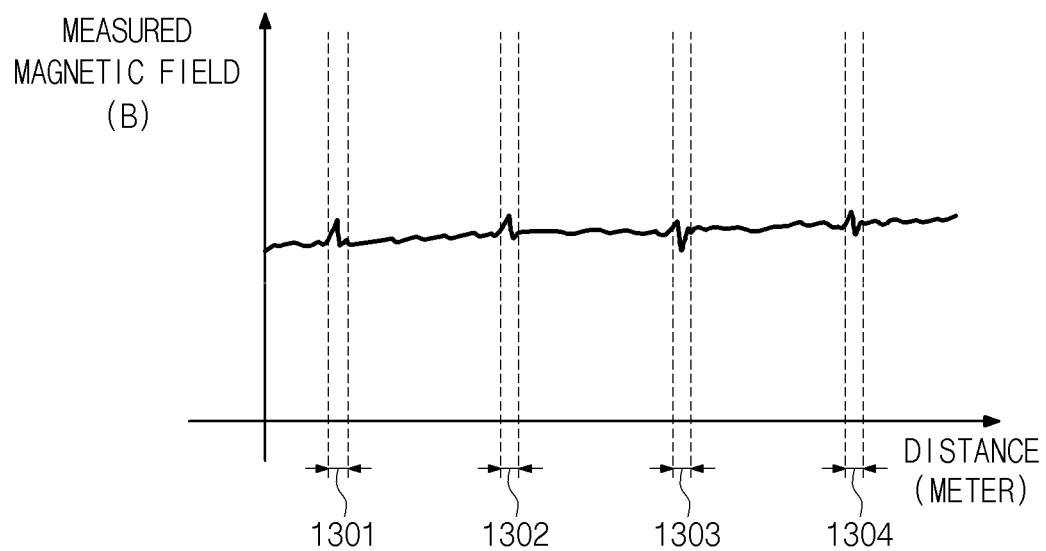
FIG. 13 is a diagram illustrating an example of a magnetic field correction interval according to the present invention.

For example, peaks, such as those illustrated in FIG. 13, may appear in some intervals of the entire period of the magnetic field sensed by the magnetic sensor due to an additional vehicle or an external object. Here, it may be determined that the range of change in the magnetic field intensity in the intervals in which peaks have appeared is equal to or greater than the preset reference change rate, and the corresponding intervals may be set as magnetic field correction intervals 1301 to 1304.

Here, the magnetic field correction intervals may be set in consideration of vehicle sensor data corresponding to the intervals in which the rate of change in magnetic field intensity is equal to or greater than the preset reference change rate.

That is, the present invention may set the magnetic field correction intervals in consideration of not only the magnetic field intensity value measured by the magnetic sensor, but may also the vehicle sensor data. For example, the magnetic field correction intervals may be set in additional consideration of various types of vehicle sensor data that can be sensed from the vehicle, such as acceleration data, GPS data, speed data, steering wheel manipulation data, and accelerator data.

Figure 14:
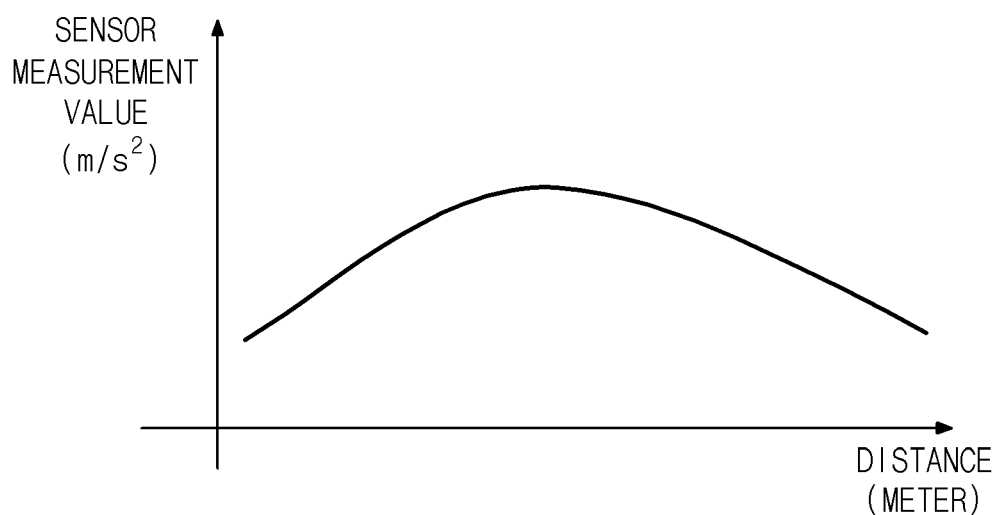
FIG. 14 is a diagram illustrating an example of vehicle sensor data according to the present invention.

It may be assumed that, while the magnetic field intensity is sensed by the magnetic sensor, as illustrated in FIG. 13, vehicle sensor data, such as that illustrated in FIG. 14, is sensed through various sensors provided in the vehicle. That is, the graph illustrated in FIG. 13 and the graph illustrated in FIG. 14 correspond to different types of sensing data that are simultaneously measured while the vehicle is traveling, and may be caused to match each other, as illustrated in FIG. 15.

Therefore, the magnetic field correction intervals may be set additionally in consideration of the rate of change in the vehicle sensor data matching intervals 1501 to 1504 to the intervals in which peaks appear in FIG. 13.

Figure 15:
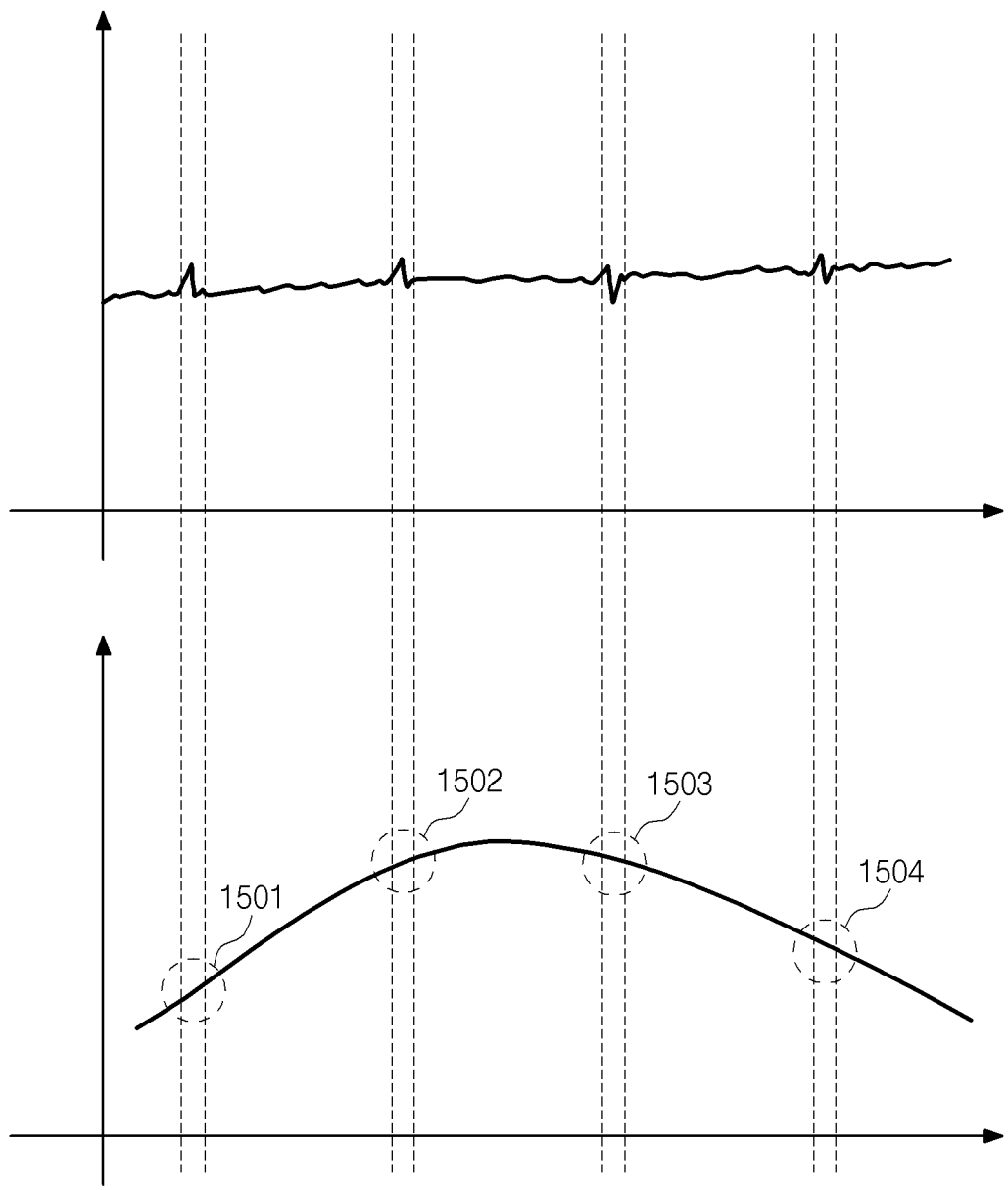
FIG. 15 is a diagram illustrating an example in which a magnetic field correction interval is set in consideration of vehicle sensor data according to the present invention.

Here, when the rate of change in the vehicle sensor data matching intervals 1501 to 1504 does not sharply appear, as illustrated in FIG. 15, the corresponding intervals may not be set as magnetic field correction intervals even if peaks have appeared in the magnetic field measurement data, such as that illustrated in FIG. 13. Assuming that the rate of change in the vehicle sensor data matching intervals 1501 to 1504 sharply appears, unlike FIG. 15, the corresponding intervals may be set as magnetic field correction intervals, and data in the magnetic field correction intervals may also be corrected in consideration of the type of sharply changing vehicle sensor data.

Here, the vehicle sensor data may correspond to a weighted average of the pieces of data measured by two or more of an acceleration sensor, a GPS sensor, a speed sensor, a steering wheel sensor, and an accelerator sensor.

For example, a weighted average of the acceleration data and accelerator data respectively measured by the acceleration sensor and the accelerator sensor may be calculated and used as the vehicle sensor data, or alternatively, a weighted average of GPS data and steering wheel manipulation data respectively measured by the GPS sensor and the steering wheel sensor may be calculated and used as the vehicle sensor data.

Here, the types of the above-described vehicle sensor data are only examples, and various types of data that can be sensed during the travel of the vehicle may be utilized in addition to the data sensed by the acceleration sensor, the GPS sensor, the speed sensor, the steering wheel sensor, and the accelerator sensor.

Further, although not illustrated in FIG. 2, the lane detection method according to the embodiment of the present invention may sense magnetic fields generated from magnetic particles contained in lane lines based on the magnetic sensor attached to the vehicle, and may calculate the speed of the vehicle using an alternating magnetic pattern of the lane lines and the sensed magnetic fields.

Hereinafter, a process for calculating the speed will be described in detail with reference to FIGS. 16 to 19.

Figure 16:
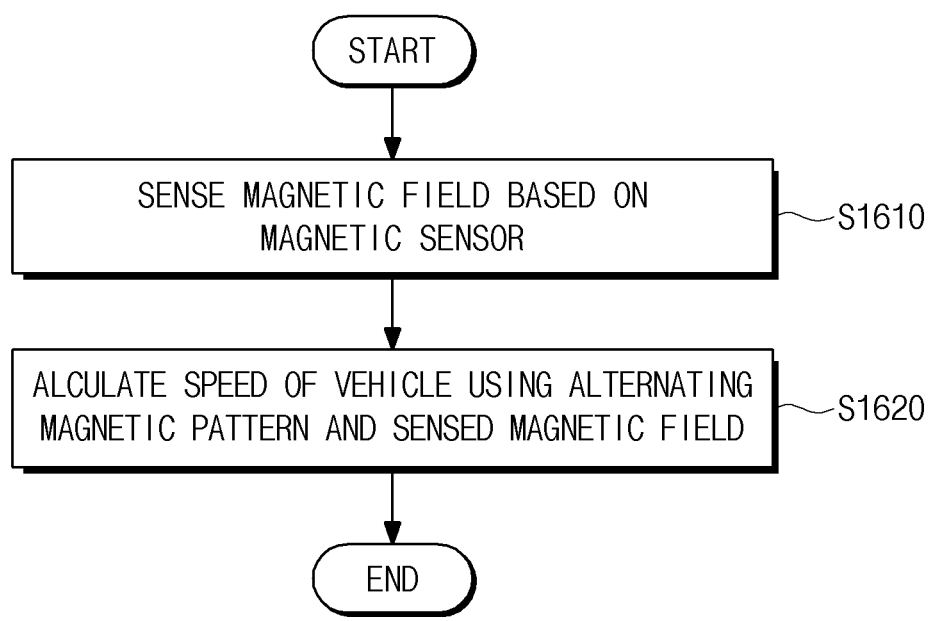
FIG. 16 is an operation flowchart illustrating a speed measurement method according to an embodiment of the present invention.

First, referring to FIG. 16, a magnetic field generated from magnetic particles contained in a lane line may be sensed based on a magnetic sensor attached to a vehicle at step S1610.

Here, the magnetic particles may be contained in road-marking paint for drawing the lane line, and may output a magnetic field in accordance with an alternating magnetic field that is applied during a procedure for applying the road-marking paint.

In this case, the alternating magnetic field applied to the magnetic particles may be applied either at the same time that the road-marking paint is applied or after the road-marking paint has been applied.

Figure 17:
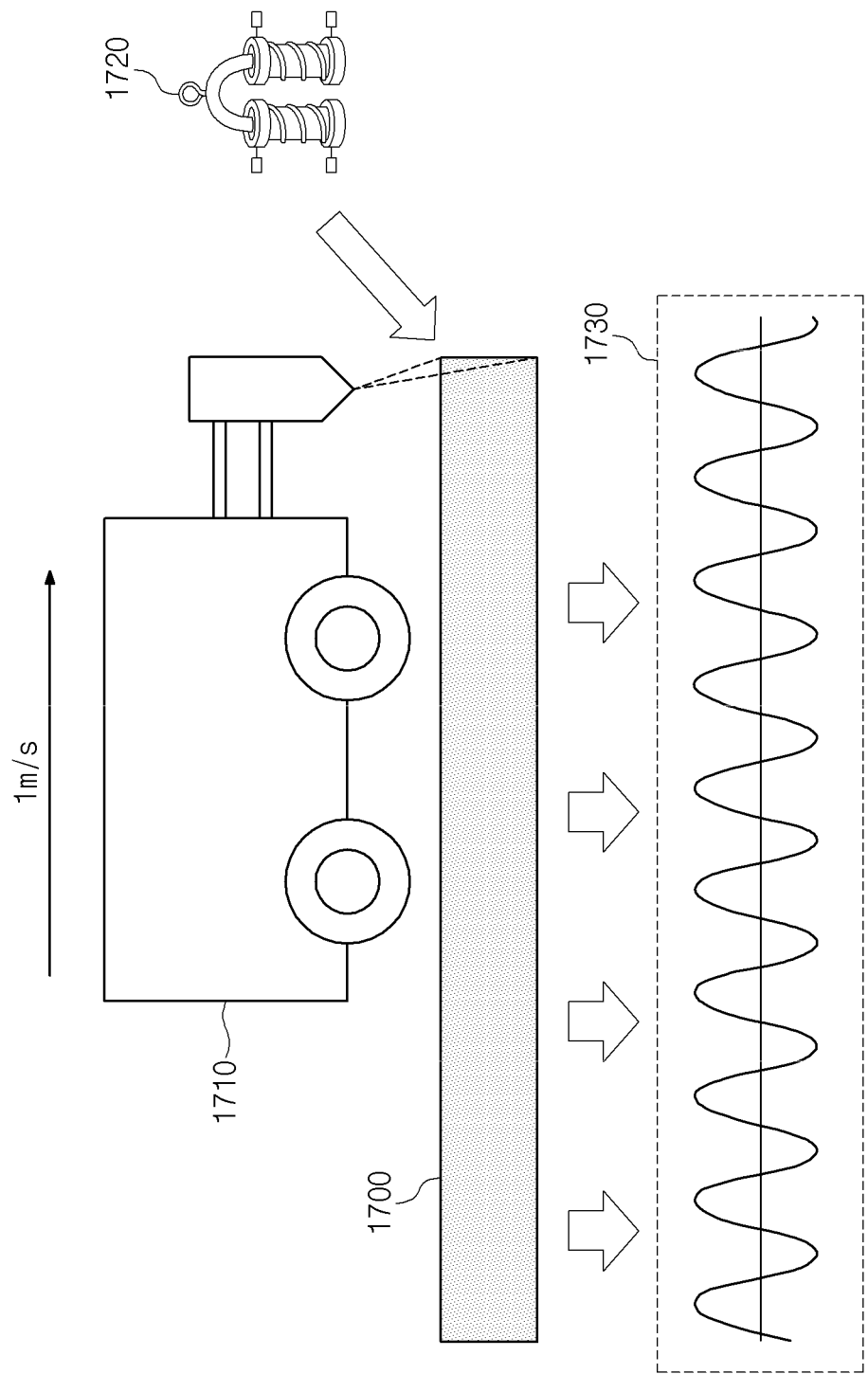
FIG. 17 is a diagram illustrating an example in which road-marking paint is applied onto the road and an alternating magnetic field is applied thereto according to the present invention.

In an example, as illustrated in FIG. 17, the alternating magnetic field may be applied to magnetic particles using an alternating magnetic field generation device 1720 at the same that that road-marking paint is applied onto the road using a construction device 1710.

In another example, an alternating magnetic pattern 1730 may be generated by applying an alternating magnetic field to magnetic particles contained in a lane line 1700 using the alternating magnetic field generation device 1720 after road-marking paint has been applied onto the road using the construction device 1710.

When the construction device 1710 applies the road-marking paint while moving at a speed of 1 m/s (3.6 km per hour) at the same time that the alternating magnetic field generation device 1720 applies an alternating magnetic field at a frequency of 20 Hz, an alternating magnetic pattern in which magnetic fields are alternating at intervals of 1/20 seconds or 0.05 m may be formed.

Also, the speed of the vehicle may be calculated using the alternating magnetic pattern of the lane line and the sensed magnetic field at step S1620.

Here, the speed of the vehicle may be calculated based on the ratio of a second frequency corresponding to the frequency of the sensed magnetic field to a first frequency corresponding to the frequency of the alternating magnetic pattern.

For example, assuming that the first frequency corresponding to the alternating magnetic pattern is 20 Hz, it may be determined that an alternating signal in which an N pole and an S pole alternately change at intervals of 1/20 seconds or 0.05 m is generated. That is, the second frequency sensed by the magnetic sensor of the vehicle traveling at a speed of 1 m/s (3.6 km/h) may correspond to 20 Hz.

Assuming that the second frequency corresponding to the magnetic field sensed by the magnetic sensor is 200 Hz, the ratio of the second frequency to the first frequency is 10, and thus the speed of the vehicle may be calculated as 10 m/s (36 km/h), which is ten times as high as 1 m/s (3.6 km/h).

Alternatively, assuming that the second frequency corresponding to the magnetic field sensed by the magnetic sensor is 400 Hz, the ratio of the second frequency to the first frequency is 20, and thus the speed of the vehicle may be calculated as 20 m/s (72 km/h), which is 20 times as high as 1 m/s (3.6 km/h).

At this time, the first frequency corresponding to the alternating magnetic pattern may be standardized.

Assuming that an alternating magnetic pattern is constructed to be repeatedly alternated at intervals of 0.05 m on a road on which the maximum speed is 72 km/h, the speed of the vehicle may be recognized as 72 km/h when the second frequency is detected as 400 Hz. However, assuming that the alternating magnetic pattern is not maintained at regular intervals in some sections of the road and is constructed to be repeated at intervals of 0.5 m, and that the vehicle travels at the same speed, the second frequency is detected as 40 Hz, thus making it difficult to accurately detect the speed of the vehicle.

Therefore, the present invention may construct lane lines on the road so that the interval between alternating magnetic patterns is maintained at a regular interval, that is, so that the first frequency corresponding to the alternating magnetic pattern is standardized, regardless of whether the construction device is a construction device (having a small wheel) having a size that can be moved by a human hand or a construction device (having a large wheel) having a size such as that of a truck when lane lines are constructed on the road.

For this operation, the present invention may use the circumference of the wheel to be used to move the construction device and the radius of the wheel.

For example, assuming that the circumference of the wheel of the construction device is $2\pi R$, the radius of the wheel may be R. When the radius of the wheel is divided by the interval between magnetic alternating patterns, the number of times that the alternating magnetic field is to be changed when the wheel of the construction device is rotated once may be calculated, and thus the alternating magnetic field may be applied depending on the rotation angle of the wheel using the results of the calculation. Here, the rotation angle of the wheel may be measured based on a rotation detection sensor provided on the wheel or the shaft of the wheel, and the sensor and the alternating magnetic field generation apparatus are operated in conjunction with each other, thus enabling construction to be performed such that the first frequency is standardized regardless of the movement speed of the construction device.

Therefore, the present invention may maintain the interval between alternating magnetic patterns at a regular interval during a process for constructing lane lines based on the circumference of the wheel used in the construction device.

Here, when the second frequency is not uniform, a frequency-setting interval, in which the rate of change in the frequency is less than or equal to a preset reference value, of the entire period of the second frequency, may be detected, and the speed of the vehicle may be calculated using the second frequency corresponding to the frequency-setting interval.

Figure 18:
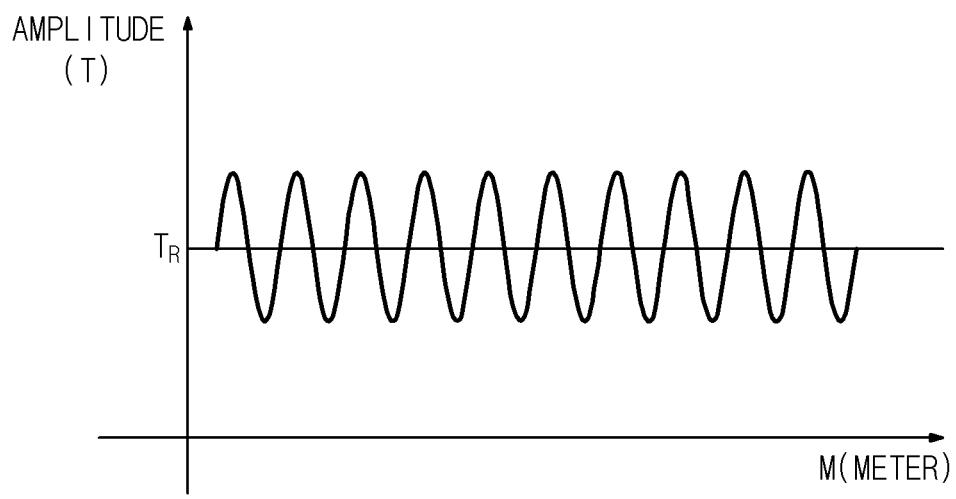
FIG. 18 is a diagram illustrating an example of a second frequency corresponding to a sensed magnetic field according to the present invention.
Figure 19:
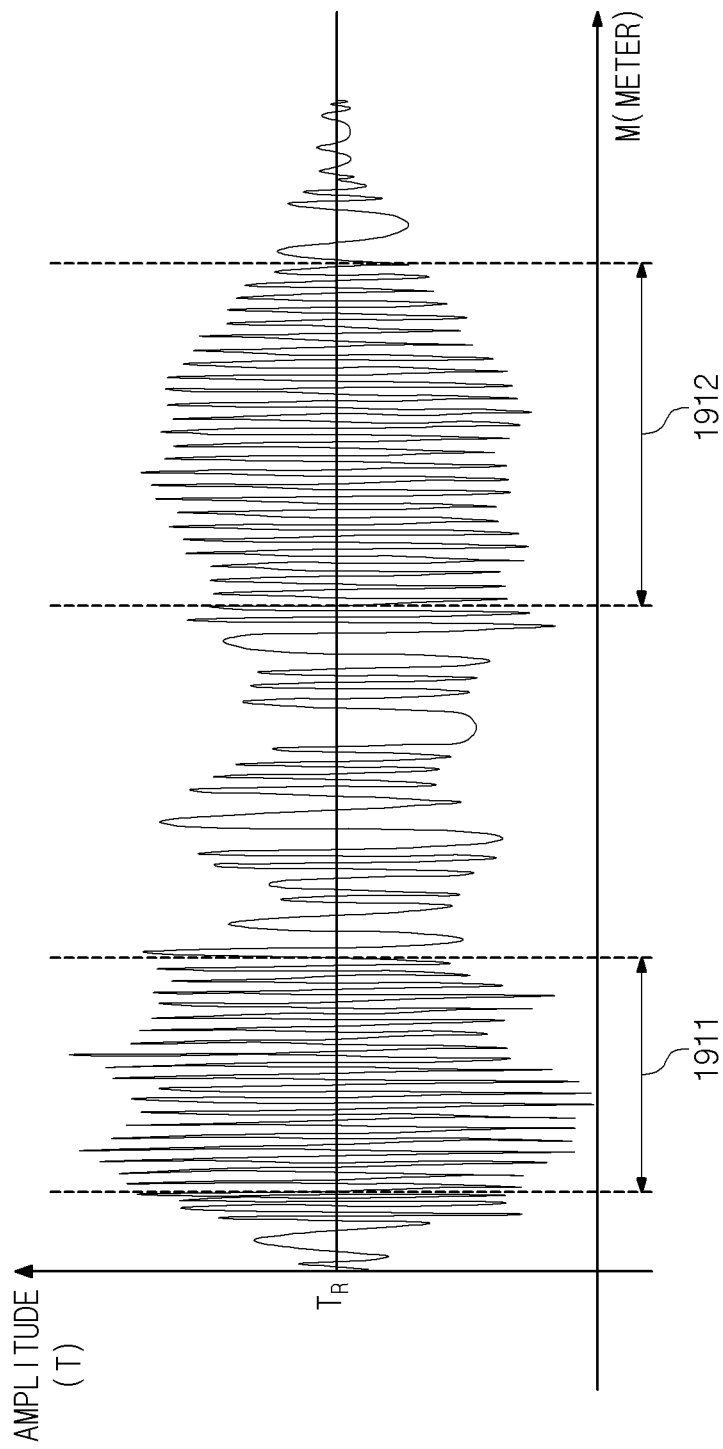
FIG. 19 is a diagram illustrating an example of a frequency-setting interval according to the present invention.

For example, when the second frequency sensed by the magnetic sensor is uniform, it may be represented by a uniform period and a uniform amplitude, as illustrated in FIG. 18, but there is a strong possibility that the second frequency, which is typically sensed while the vehicle is traveling, will not be uniform, as illustrated in FIG. 19.

Here, when the second frequency sensed by the magnetic sensor is not uniform, as illustrated in FIG. 19, the present invention may detect a frequency-setting interval determined to be suitable for the measurement of the speed of the vehicle, and may use the frequency-setting interval to calculate the speed of the vehicle.

That is, assuming that the second frequency is sensed, as illustrated in FIG. 19, intervals during which frequency change is stable, of the entire period of the second frequency, may be set as frequency-setting intervals 1911 and 1912. Here, the intervals during which frequency change is stable may be set by comparing the frequency measured in the corresponding intervals with a preset reference frequency.

Furthermore, the frequency-setting intervals may be set using the rate of change in the strength of a measurement signal or in the amplitude of the measurement signal.

For example, an interval during which the strength of the measurement signal varies greatly, exceeding a preset change rate, may be excluded from the frequency-setting intervals. Here, the preset change rate may be obtained based on other sensor measurement values (e.g., a speed sensor, an acceleration sensor, a pedal motion sensor, a pedal angle sensor, etc.) measured in the vehicle, rather than values measured by the magnetic sensor.

In another example, an interval during which the amplitude of the measurement signal varies greatly, exceeding a preset change rate, may be excluded from the frequency-setting intervals.

In a further example, a frequency prediction value that is predicted based on other sensor measurement values measured in the vehicle may be generated, and may be compared with an actually measured frequency, and thus an interval in which the frequencies are not similar to each other may be excluded from frequency-setting intervals. For example, when frequency change decreases on the contrary in an interval in which the speed is predicted to gradually increase depending on the pedal angle measurement value, the corresponding interval may be excluded from the frequency-setting intervals.

In this case, a candidate interval determined to be excluded from frequency-setting intervals may be established based on a preset error range, and the candidate interval is subdivided into preset reference units and then analyzed, and thus a final interval to be excluded from frequency-setting intervals may be determined.

For example, assuming that the preset error range is N and the location of an interval at which the strength of a measurement signal varies maximally, exceeding the preset change rate, is A, a range from (A−N) to (A+N) may be established as the candidate interval. Thereafter, assuming that the preset reference unit is B, the candidate interval is subdivided into B units and is precisely analyzed, and thus the final interval to be excluded from the frequency-setting intervals may be determined.

Here, the amplitude of the second frequency may vary with the distance between the magnetic sensor and each lane line. For example, when the vehicle is traveling while being spaced apart from the corresponding lane line by a predetermined distance, the second frequency may be detected with a relatively uniform amplitude. However, as the vehicle becomes closer to the lane line, the amplitude of the second frequency may increase, whereas as the vehicle becomes far away from the lane line, the amplitude of the second frequency may decrease.

Further, although not illustrated in FIG. 2, the lane detection method according to an embodiment of the present invention may determine whether the vehicle is traveling at an excessive speed based on the speed limit of the road and the speed of the vehicle, and may provide an alarm to the driver of the vehicle or provide feedback causing the control module of the vehicle to reduce the speed if it is determined that the vehicle is traveling at an excessive speed.

Here, the method for providing an alarm to the driver is not limited to a specific method, and methods capable of stimulating various senses, such as visual, auditory, touch, and olfactory senses of the driver, may be utilized.

Further, although not illustrated in FIG. 2, the lane detection method according to the embodiment of the present invention may transmit and receive information required for lane detection over a communication network such as a network. In particular, the lane detection method according to the present invention may receive magnetic field information sensed by the magnetic sensor, or may transmit a driving control signal for the vehicle, a route notification signal, etc.

Further, although not illustrated in FIG. 2, the lane detection method according to an embodiment of the present invention may store various types of information, generated during a lane detection process according to the embodiment of the present invention, as described above, in a separate storage module.

By means of the lane detection method, a method that is capable of detecting lane lines without being influenced by weather conditions or visibility may be provided, thus preventing a critical accident that may occur when lanes are detected using other methods.

Furthermore, lane lines may be more efficiently detected than when using conventional schemes, and errors that may occur during lane detection may be reduced, and thus an accident that may occur during traveling may be prevented.

Figure 20:
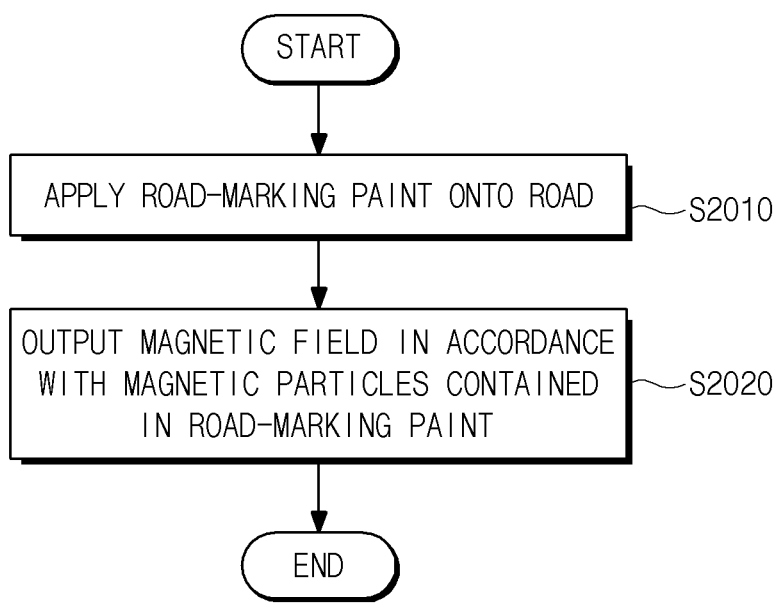
FIG. 20 is an operation flowchart illustrating a magnetic field generation method according to an embodiment of the present invention.

FIG. 20 is an operation flowchart illustrating a method for generating a magnetic field according to an embodiment of the present invention.

Referring to FIG. 20, the magnetic field generation method according to the embodiment of the present invention applies road-marking paint for indicating lane lines onto the road at step S2010.

Further, the magnetic field generation method according to the embodiment of the present invention outputs a magnetic field sensed by a vehicle to which a magnetic sensor is attached in accordance with magnetic particles contained in the road-marking paint at step S2020.

Here, any one of addition concentration of particles, a magnetization pattern, and a remanent magnetization property may be differently set depending on the type of lane line. Therefore, different magnetic fields may be output for respective lane line types.

For example, magnetic fields having different properties may be output by differently setting any one of addition concentration of magnetic particles, a magnetization pattern, and a remanent magnetization property of magnetic particles depending on various types of lane lines related to traffic rules, such as a dotted lane line allowing a lane change, a solid lane line or double lane line disallowing a lane change, and a zigzag lane line causing the speed of a vehicle to be reduced.

In this case, the vehicle may classify the types of multiple lane lines based on any one of a magnetic field intensity corresponding to each lane line and a change in the magnetic field attributable to the magnetization pattern, wherein the magnetic field intensity may be designated to be identified in accordance with any one of the addition concentration of magnetic particles and the remanent magnetization property.

In an example, as the addition concentration of magnetic particles is greater, the intensity of the magnetic field output from the corresponding lane line may be larger.

In another example, the magnetic field intensity of a lane line containing magnetic particles having a higher remanent magnetization property may be greater than that of a lane line containing magnetic particles having a lower remanent magnetization property.

Further, although not illustrated in FIG. 20, the magnetic field generation method according to the embodiment of the present invention may generate an alternating magnetic field corresponding to an alternating magnetic pattern to be applied to the lane line based on the rotation angle of the wheel of a construction device which applies the road-marking paint for indicating lane lines onto the road.

For example, when road-marking paint containing magnetic particles is applied onto the road in the case in which the construction device is a vehicle or in which a person manually pulls the construction device, it may be difficult to maintain the frequency of the alternating magnetic pattern at a uniform frequency. Alternatively, the frequency of an alternating magnetic pattern may vary even when the construction device is not moved at a constant speed. In order to prevent this problem, the present invention is intended to provide a scheme that is capable of maintaining the interval between alternating magnetic patterns at a uniform interval by generating an alternating magnetic field to be applied in consideration of the rotation angle of the wheel of the construction device, regardless of the type of construction device.

Here, as the construction device moves in accordance with the rotation angle of the wheel, the number of alternations of a magnetic field for maintaining an alternating magnetic pattern on the painted lane line may be calculated, and an alternating magnetic field corresponding to the calculated number of magnetic field alternations may be generated.

Figure 21:
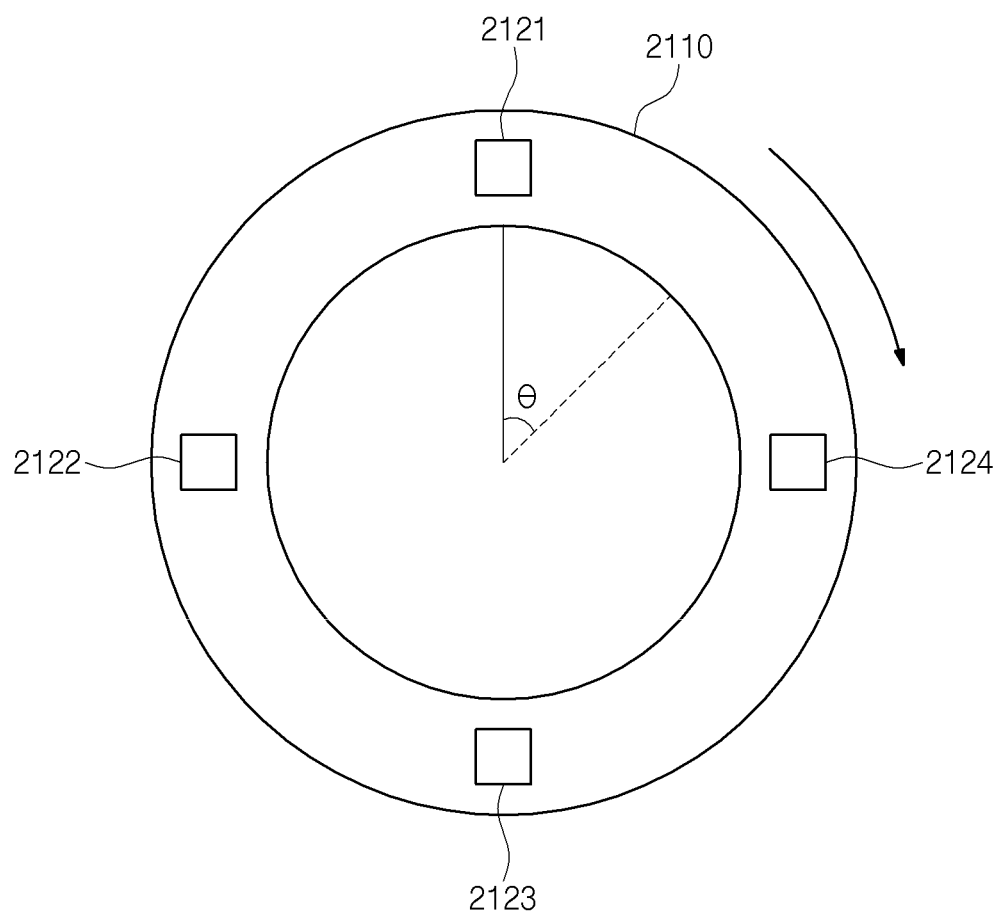
FIG. 21 is a diagram illustrating an example in which the rotation angle of the wheel of a construction device is detected according to the present invention.

For example, referring to FIG. 21, it can be seen that the wheel 2110 of the construction device is rotated at an angle of θ. Here, assuming that the circumference of the wheel 2110 is $2\pi R$ (where R is the radius of the wheel), the lane line constructed by the construction device in accordance with θ may be calculated as $2\pi R*\theta/360$. Therefore, the number of times that the N pole and the S pole of the magnetic field must alternate when the construction device is moved by $2\pi R*\theta/360$ may be calculated in consideration of the interval between the alternating magnetic patterns, and the alternating magnetic field may be generated in accordance with the number of alternations of the magnetic field calculated in this way and then used for construction.

In this case, the wheel 2110 of the construction device may be equipped with multiple rotation detection sensors 2121 to 2124, as illustrated in FIG. 21, to detect the rotation angle of the wheel. Also, each of the rotation detection sensors according to the embodiment of the present invention may be provided and operated on the shaft of the wheel of the construction device, similarly to a step motor that is rotated to a specific angle.

In this case, the present invention may use various types of rotation detection sensors that are capable of detecting the rotation angle of the wheel, without being limited to any one type.

Furthermore, although not illustrated in FIG. 20, the magnetic field generation method according to the embodiment of the present invention may apply the generated alternating magnetic field to magnetic particles contained in road-marking paint.

Here, the alternating magnetic field may be applied either at the same time that road-marking paint is applied by the construction device or after the road-marking paint has been applied.

In this case, the alternating magnetic field may be applied based on the alternating magnetic field generation device, which may be operated in conjunction with the rotation detection sensors. Because the alternating magnetic field generation device applies the alternating magnetic field in conjunction with the rotation detection sensors in this way, construction may be performed while the frequency of the alternating magnetic pattern is maintained at a uniform frequency, regardless of the movement speed of the construction device.

Figure 22:
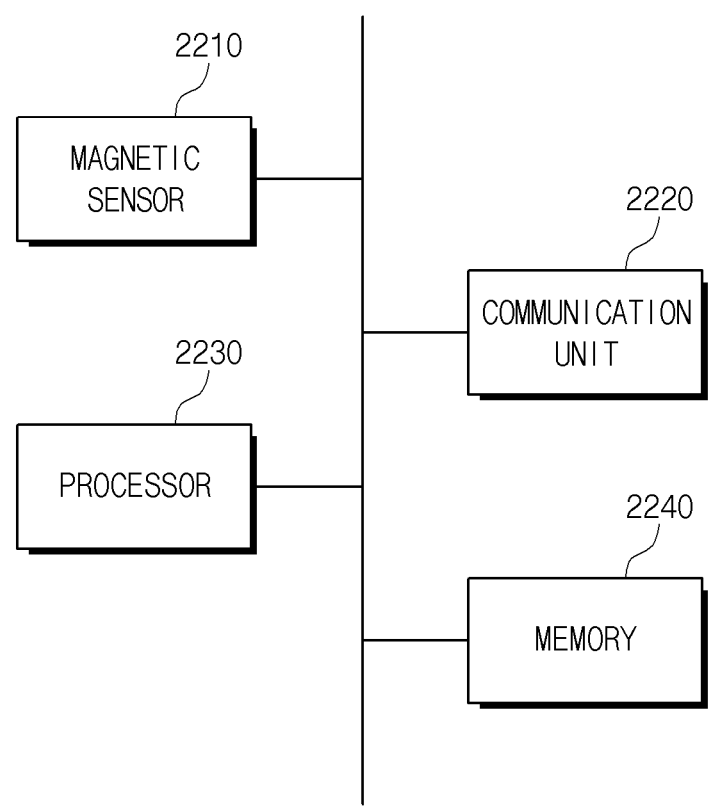
FIG. 22 is a block diagram illustrating a vehicle according to an embodiment of the present invention.

FIG. 22 is a block diagram illustrating a vehicle according to an embodiment of the present invention.

Referring to FIG. 22, an autonomous vehicle using a lane detection method according to an embodiment of the present invention includes a magnetic sensor 2210, a communication unit 2220, a processor 2230, and memory 2240.

The magnetic sensor 2210 senses magnetic fields corresponding to magnetic particles contained in multiple lane lines.

Here, the multiple lane lines may be applied onto the road using road-marking paint containing magnetic particles. Therefore, magnetic fields corresponding to respective lane lines may be output from multiple lane lines painted on the road, and the present invention provides a method for allowing the vehicle to detect lane lines using the magnetic fields.

Here, the magnetic sensor may be a composite sensor in which a high-sensitivity sensor and a low-sensitivity sensor are combined with each other.

Therefore, the magnetic sensor may generate pieces of sensing information for respective sensing sensitivity levels by combining sensing results obtained by the high-sensitivity sensor with sensing results obtained by the low-sensitivity sensor for the magnetic fields corresponding to magnetic particles contained in the multiple lane lines.

For example, it may be assumed that lane line A, indicated by a solid line, and lane line B, indicated by a dotted line, are respectively located on both sides of the road on which the vehicle is traveling. Here, the magnetic sensor attached to the vehicle may generate magnetic field sensing results for lane line A by combining high-sensitivity sensing results and low-sensitivity sensing results for a magnetic field output from lane line A, and may generate magnetic field sensing results for lane line B by combining high-sensitivity sensing results and low-sensitivity sensing results for a magnetic field output from lane line B. When a magnetic field is sensed only by the high-sensitivity sensor and is not sensed by the low-sensitivity sensor, the magnetic field sensing results may be generated using only the high-sensitivity sensing results.

Here, the magnetic particles may be contained in road-marking paint for drawing lane lines, and may output a magnetic field in accordance with an alternating magnetic field applied while the road-marking paint is applied.

In this case, the alternating magnetic field applied to the magnetic particles may be applied either at the same time that the road-marking paint is applied or after the road-marking paint has been applied.

For example, as illustrated in FIG. 17, an alternating magnetic field may be applied to magnetic particles using an alternating magnetic field generation device 1720 at the same that that road-marking paint is applied onto the road using a construction device 1710.

In another example, an alternating magnetic pattern 1730 may be generated by applying the alternating magnetic field to the magnetic particles contained in a lane line 1700 using the alternating magnetic field generation device 1720 after road-marking paint has been applied onto the road using the construction device 1710.

When the construction device 1710 applies the road-marking paint while moving at a speed of 1 m/s (3.6 km per hour) at the same time that the alternating magnetic field generation device 1720 applies an alternating magnetic field at a frequency of 20 Hz, an alternating magnetic pattern in which magnetic fields are alternating at an interval of 1/20 seconds or 0.05 m may be formed.

The communication unit 2220 may function to transmit and receive information required for travel of the vehicle over a communication network such as a network. In particular, the communication unit 2220 according to an embodiment of the present invention may receive information sensed by the magnetic sensor 2210, or may transmit a driving control signal for the vehicle or an alert notification for a driver to a driving control module or an alert notification module.

The processor 2230 may detect multiple lane lines based on the magnetic fields sensed by the magnetic sensor 2210.

Here, the multiple lane lines may be simultaneously or sequentially detected based on the magnetic fields.

In an example, when multiple lane lines are sequentially detected, they may be sequentially detected in the order of intensity of an output magnetic field from the lane line having the largest magnetic field intensity to the lane line having the smallest magnetic field intensity. In another example, a specific type of lane line may be detected first depending on the types of multiple lane lines.

Here, the present invention is not limited to any one of a scheme for simultaneously detecting multiple lane lines and a scheme for sequentially detecting multiple lane lines, and may detect multiple lane lines using various schemes in addition to the above schemes.

Here, the types of multiple lane lines may be classified based on the magnetic fields.

For example, various types of lane lines related to traffic rules may be classified into a dotted lane line that allows a lane change, a solid lane line or double lane line that disallows a lane change, and a zigzag lane line that causes the speed of a vehicle to be reduced.

Here, the types of multiple lane lines may be classified based on any one of the magnetic field intensity corresponding to each of the lane lines and change in the magnetic field attributable to a magnetization pattern.

For example, as illustrated in FIG. 3, it may be assumed that there are a lane line 310 which is a solid line and a lane line 320 which is a dotted line on the road, and that a vehicle is traveling between the two lane lines 310 and 320. Here, when a magnetic field output from the lane line 310 which is a solid line is greater than the magnetic field output from the lane line 320 which is a dotted line, the low-sensitivity sensor of the magnetic sensor 330 attached to the vehicle may sense only the magnetic field output from the lane line 310 which is a solid line. That is, the pieces of sensing information for respective sensing sensitivity levels for the magnetic field output from the lane line 310 which is a solid line include both high-sensitivity sensing information and low-sensitivity sensing information, but the pieces of sensing information for respective sensing sensitivity levels for the magnetic field output from the lane line 320 which is a dotted line include only high-sensitivity sensing information.

Therefore, since pieces of sensing information for respective sensing sensitivity levels of the magnetic fields output from the lane line 310 which is a solid line and the magnetic field output from the lane line 320 which is a dotted line are different from each other, the vehicle may recognize that the two lane lines 310 and 320 are different types of lane lines.

Here, the pieces of magnetic field characteristic information for respective types of lane lines may be stored and managed in separate memory provided in the vehicle, and the magnetic field output from the lane line 310 which is a solid line and the magnetic field output from the lane line 320 which is a dotted line are respectively compared with the pieces of magnetic field characteristic information for respective types of lane lines, and thus the type of the corresponding lane line may be determined.

In this case, the X axis of a graph illustrated in FIG. 4 may denote values obtained by representing the location of the magnetic sensor 330, illustrated in FIG. 3, in meters, and the Y axis thereof may denote a magnetic flux density or a magnetic field intensity which is the intensity of a magnetic field. Therefore, as in the case of the above example, when the intensity of the magnetic field output from the lane line 310 which is a solid line is greater than that of the magnetic field output from the lane line 320 which is a dotted line, a magnetic field sensing signal 410 for the lane line 310 which is a solid line may be distributed to generally have values greater than those of a magnetic field sensing signal 420 for the lane line 320 which is a dotted line.

In this case, the magnetic field intensity may be designated to be identified in accordance with any one of addition concentration and remanent magnetization property of magnetic particles.

In an example, assuming that the lane line 310 which is a solid line and the lane line 320 which is a dotted line, as illustrated in FIG. 3, contain the same type of magnetic particles, the intensities of magnetic fields output from the two lane lines 310 and 320 may be distinguished from each other by adding more magnetic particles to road-marking paint for drawing the lane line 310 which is a solid line than the magnetic particles of the road-marking paint for drawing the lane line 320 which is a dotted line.

In another example, assuming that magnetic particles having different remanent magnetization properties are added to the lane line 310 which is a solid line and the lane line 320 which is a dotted line, as illustrated in FIG. 3, the intensities of magnetic fields output from the two lane lines 310 and 320 may be distinguished from each other by adding magnetic particles having greater remanent magnetization properties to the lane line 310 which is a solid line than those of the lane line 320 which is a dotted line.

Further, the processor 2230 may also classify the types of lane lines by artificially forming a magnetization pattern for magnetic particles contained in lane lines 510 and 520, as illustrated in FIG. 5.

Here, the magnetization pattern may be set based on the magnetic moment directions 501 and 502 of magnetic particles aligned by an external magnetic field when road-marking paint for drawing multiple lane lines is applied.

That is, as illustrated in FIG. 5, the lane line 510 may be magnetized such that when road-marking paint for drawing the lane line 510 is applied onto the road, the magnetic moment direction of magnetic particles corresponds to an alternating pattern, and the lane line 520 may be magnetized such that when road-marking paint for drawing the lane line 520 is applied onto the road, the magnetic moment direction of magnetic particles corresponds to a Y direction. Here, the magnetic particles may be aligned using a DC magnetic field or an alternating current (AC) magnetic field.

Therefore, a magnetic sensor 530 attached to the vehicle traveling between the two lane lines 530 may sense different respective magnetic field magnetization patterns for two lane lines 510 and 210. The types of respective lane lines 510 and 520 detected by the vehicle may be classified using the different magnetic field magnetization patterns sensed in this way.

That is, as illustrated in FIG. 5, assuming that a magnetic moment direction 501 is Y and a magnetic moment direction 502 is X, the magnetization pattern of a magnetic field output from the lane line 510 magnetized in accordance with an alternating pattern may be sensed, as illustrated in FIG. 6. Further, the magnetization pattern of a magnetic field output from the lane line 520 magnetized in accordance with the Y direction may be sensed, as illustrated in FIG. 7.

Therefore, the vehicle to which the magnetic sensor 530 is attached may recognize that the two lane lines 510 and 520 are different types of lane lines through the difference between the magnetization patterns, such as those in FIGS. 6 and 7.

Here, information about the magnetic field magnetization patterns for respective types of lane lines may be stored and managed in separate memory provided in the vehicle, and the magnetization pattern of a magnetic field, which is sensed by the magnetic sensor, is compared with the pieces of magnetic field magnetization pattern information for respective types of lane lines, and thus the type of the corresponding lane line may be determined.

Further, the processor 2230 generates information about the distance between at least one of multiple lane lines and the vehicle based on magnetic fields, and generates information about the location of the vehicle on the road using the distance information.

Here, based on the magnetic sensor units constituting the magnetic sensor, magnetic field sensing signals obtained by sensing magnetic fields from the left and right portions of the vehicle may be acquired, and the distance information may be generated using the difference between the strengths of the magnetic field sensing signals.

For example, referring to FIG. 9, it may be assumed that magnetic sensor unit A and magnetic sensor unit B are attached to the left and right portions of a vehicle and that the magnetic field of lane line 1 is sensed by magnetic sensor unit A and the magnetic field of lane line 2 is sensed by magnetic sensor unit B.

Here, when magnetic field sensing signals sensed by the two magnetic sensor units correspond to a magnetic field sensing signal A 1010 and a magnetic field sensing signal B 1020, respectively, as illustrated in FIG. 10, a graph 103 for the difference between the strengths of the magnetic field sensing signals, such as that illustrated in FIG. 10, may be derived.

Here, the magnetic field sensing signal A 1010 is the result of sensing the magnetic field from lane line 1 by magnetic sensor unit A with the movement of the vehicle to the left/right sides of the road, and the magnetic field sensing signal B 1020 is the result of sensing the magnetic field from lane line 2 by magnetic sensor unit B with the movement of the vehicle to the left/right sides of the road. Also, the signal strength difference graph 1030 may correspond to the result of calculating the differences between the strengths of the magnetic field sensing signal A 1010 and the magnetic field sensing signal B 1020 for respective left/right locations of the road and representing the absolute values of the differences.

Here, it can be seen that, when the vehicle is located at the center between the two lane lines, the difference between the signal strengths sensed from the respective lane lines by the two magnetic sensor units located in the left and right portions of the vehicle may be a minimum value. That is, when the vehicle deviates from the center of the lane between lane lines and approaches lane line 1, as illustrated in FIG. 11, the magnetic field sensing signal A 1010 increases, and then the values of the signal strength difference graph 1030 also increase, and even if the vehicle deviates from the center of the lane and approaches lane line 2, as illustrated in FIG. 12, the magnetic field sensing signal B 1020 increases, and then the values of the signal strength difference graph 1030 also increase.

Therefore, information about the distance between at least one of the multiple lane lines and the vehicle may be calculated based on the difference between the signal strengths of the magnetic field sensing signals sensed from the left and right portions of the vehicle, and information about the location of the vehicle on the road may be generated using the distance information.

In this case, because the present invention uses the difference between signal strengths of the magnetic field sensing signals respectively detected in the left and right portions of the vehicle, information about the distance between any one lane line and the vehicle may be calculated without being influenced by the cases where the lane lines located in the left and right portions of the vehicle are identical to each other and are different from each other.

For example, it may be assumed that lane line 1 and lane line 2 illustrated in FIG. 9 are lines of the same type and that the vehicle is approaching lane line 1, as illustrated in FIG. 11. Here, it can be seen that the vehicle deviates from the center of the road between the lane lines and is approaching any one lane line through the signal strength difference graph 1030, such as that illustrated in FIG. 10. Further, the vehicle may determine, by means of magnetic field sensing signals respectively detected by the magnetic sensor unit A and the magnetic sensor unit B, that the lane line that the vehicle is approaching is lane line 1.

Furthermore, the present invention may detect the state in which the vehicle comes into contact with any one lane line or is present over any one lane line.

In an example, referring to FIGS. 3 and 4, when the magnetic sensor 330 is located over any one of the two lane lines 310 and 320, the magnetic sensor 330 may sense the maximum output value of a magnetic field output from the corresponding lane line. That is, as illustrated in FIG. 4, B1max, which is sensed when the magnetic sensor 330 is located over the lane line 310 which is a solid line, may correspond to the maximum output magnetic field value of the lane line 310 which is a solid line, and B2max, which is sensed when the magnetic sensor 330 is located over the lane line 320 which is a dotted line, may correspond to the maximum output magnetic field value of the lane line 320 which is a dotted line.

In this way, when the maximum output magnetic field of any one of multiple lane lines is sensed through the magnetic sensor, it may be determined that the vehicle is located over the lane line corresponding to the maximum output magnetic field, and information about the location of the vehicle on the road depending on the determination may be generated.

Here, the magnetic sensor units constituting the magnetic sensor 2210 according to the embodiment of the present invention may sense magnetic fields in at least one of the left/right, front, middle, and back portion of the vehicle.

For example, referring to FIG. 8, the magnetic sensor according to the embodiment of the present invention may include multiple magnetic sensor units 811 to 813, 821 and 822 respectively attached to the left/right, front, middle, and back portions of the vehicle.

The magnetic sensor 2210 may provide information required to generate the on-road location information of the vehicle by mathematically processing magnetic fields sensed through the multiple magnetic sensor units 811 to 813, 821, and 822.

In this case, the locations or the numbers of the magnetic sensor units 811 to 813, 821, and 822 of FIG. 8 attached to the vehicle are only examples, and are not limited to those illustrated in FIG. 8.

Further, the processor 2230 generates at least one of a driving control signal for the vehicle and an alert notification for the driver based on the on-road location information.

For example, when it is determined that the vehicle is approaching a lane line disallowing a lane change based on the on-road location information, a driving control signal may be generated so that the vehicle can move to the center of the road between lane lines. Alternatively, the possibility of occurrence of an accident may be reduced by prompting the driver to recognize that the vehicle is approaching a specific lane line through the alert notification for the driver.

Furthermore, the processor 2230 may generate inter-vehicle information including at least one of the location of an additional vehicle traveling near the corresponding vehicle and the distance between the vehicle and the additional vehicle, based on the degree of distortion of the magnetic fields attributable to the additional vehicle.

For example, the vehicle 110 illustrated in FIG. 1 may recognize a phenomenon in which magnetic fields output from the multiple lane lines 101 to 103 are distorted by the additional vehicle 120 traveling in another lane, and may generate inter-vehicle information between the vehicle 110 and the additional vehicle 120 in consideration of the degree to which the magnetic fields are distorted or the extent to which the magnetic fields are distorted. Here, the inter-vehicle information may include information corresponding to at least one of the location of the additional vehicle 120 relative to the vehicle 110 and the distance between the vehicle 110 and the additional vehicle 120.

Here, the inter-vehicle information may be used in combination with information about the locations and types of multiple lane lines 101 to 103 sensed by the vehicle 110. For example, the combined information may also be used as information for detecting surroundings during the travel of the vehicle 110.

For example, when the vehicle 110 illustrated in FIG. 1 attempts to change lanes in the direction of the lane line 103, whether such a lane change is to be allowed in a safe situation may be determined based on the inter-vehicle information with the additional vehicle 120. If it is determined that the vehicle 110 attempts to change a lane in the state in which a safe distance to the additional vehicle 120 is not maintained, driving may be controlled to prevent the lane change, or alternatively, an alert notification may be generated.

Furthermore, the processor 2230 may set a magnetic field correction interval in which the rate of change in the corresponding magnetic field intensity is equal to or greater than a preset reference change rate, for each of the sensed magnetic fields, and may correct data corresponding to the magnetic field correction interval.

Here, the interval in which the range of change in the magnetic field intensity is equal to or greater than the preset reference change rate may literally mean the interval in which the intensity of the magnetic field changes sharply. That is, the magnetic sensor of the vehicle may be influenced by various factors, such as an additional vehicle on the road or an object installed on the road, in addition to magnetic fields generated from magnetic particles contained in lane lines. Therefore, the present invention may set the magnetic field correction interval so as to eliminate noise attributable to such various factors, and may correct the data corresponding to the corresponding interval.

Here, the preset reference change rate is set to a value suitable for the elimination of noise, but the setting thereof may be freely changed depending on the sensitivity of the magnetic sensor or the external environment.

For example, peaks, such as those illustrated in FIG. 13, may appear in some intervals of the entire period of the magnetic field sensed by the magnetic sensor due to an additional vehicle or an external object. Here, it may be determined that the range of change in the magnetic field intensity in the intervals in which peaks have appeared is equal to or greater than the preset reference change rate, and the corresponding intervals may be set as magnetic field correction intervals 1301 to 1304.

Here, the magnetic field correction intervals may be set in consideration of vehicle sensor data corresponding to the intervals in which the rate of change in magnetic field intensity is equal to or greater than the preset reference change rate.

That is, the present invention may set the magnetic field correction intervals in consideration of not only the magnetic field intensity value measured by the magnetic sensor, but may also the vehicle sensor data. For example, the magnetic field correction intervals may be set in additional consideration of various types of vehicle sensor data that can be sensed from the vehicle, such as acceleration data, GPS data, speed data, steering wheel manipulation data, and accelerator data.

It may be assumed that, while the magnetic field intensity is sensed by the magnetic sensor, as illustrated in FIG. 13, vehicle sensor data, such as that illustrated in FIG. 14, is sensed through various sensors provided in the vehicle. That is, the graph illustrated in FIG. 13 and the graph illustrated in FIG. 14 correspond to different types of sensing data that are simultaneously measured while the vehicle is traveling, and may be caused to match each other, as illustrated in FIG. 15.

Therefore, the magnetic field correction intervals may be set additionally in consideration of the rate of change in the vehicle sensor data matching intervals 1501 to 1504 to the intervals in which peaks appear in FIG. 13.

Here, when the rate of change in the vehicle sensor data matching intervals 1501 to 1504 does not sharply appear, as illustrated in FIG. 15, the corresponding intervals may not be set as magnetic field correction intervals even if peaks have appeared in the magnetic field measurement data, such as that illustrated in FIG. 13. Assuming that the rate of change in the vehicle sensor data matching intervals 1501 to 1504 sharply appears, unlike FIG. 15, the corresponding intervals may be set as magnetic field correction intervals, and data in the magnetic field correction intervals may also be corrected in consideration of the type of sharply changing vehicle sensor data.

Here, the vehicle sensor data may correspond to a weighted average of the pieces of data measured by two or more of an acceleration sensor, a GPS sensor, a speed sensor, a steering wheel sensor, and an accelerator sensor.

For example, a weighted average of the acceleration data and accelerator data respectively measured by the acceleration sensor and the accelerator sensor may be calculated and used as the vehicle sensor data, or alternatively, a weighted average of GPS data and steering wheel manipulation data respectively measured by the GPS sensor and the steering wheel sensor may be calculated and used as the vehicle sensor data.

Here, the types of the above-described vehicle sensor data are only examples, and various types of data that can be sensed during the travel of the vehicle may be utilized in addition to the data sensed by the acceleration sensor, the GPS sensor, the speed sensor, the steering wheel sensor, and the accelerator sensor.

Further, the processor 2230 may sense a magnetic field generated from magnetic particles contained in a lane line may be sensed based on a magnetic sensor attached to a vehicle.

Here, the magnetic particles may be contained in road-marking paint for drawing the lane line, and may output a magnetic field in accordance with an alternating magnetic field that is applied during a procedure for applying the road-marking paint.

In this case, the alternating magnetic field applied to the magnetic particles may be applied either at the same time that the road-marking paint is applied or after the road-marking paint has been applied.

In an example, as illustrated in FIG. 17, the alternating magnetic field may be applied to magnetic particles using an alternating magnetic field generation device 1720 at the same that that road-marking paint is applied onto the road using a construction device 1710.

In another example, an alternating magnetic pattern 1730 may be generated by applying an alternating magnetic field to magnetic particles contained in a lane line 1700 using the alternating magnetic field generation device 1720 after road-marking paint has been applied onto the road using the construction device 1710.

When the construction device 1710 applies the road-marking paint while moving at a speed of 1 m/s (3.6 km per hour) at the same time that the alternating magnetic field generation device 1720 applies an alternating magnetic field at a frequency of 20 Hz, an alternating magnetic pattern in which magnetic fields are alternating at intervals of 1/20 seconds or 0.05 m may be formed.

Also, the processor 2230 may calculate the speed of the vehicle using the alternating magnetic pattern of the lane line and the sensed magnetic field.

Here, the speed of the vehicle may be calculated based on the ratio of a second frequency corresponding to the frequency of the sensed magnetic field to a first frequency corresponding to the frequency of the alternating magnetic pattern.

For example, assuming that the first frequency corresponding to the alternating magnetic pattern is 20 Hz, it may be determined that an alternating signal in which an N pole and an S pole alternately change at intervals of 1/20 seconds or 0.05 m is generated. That is, the second frequency sensed by the magnetic sensor of the vehicle traveling at a speed of 1 m/s (3.6 km/h) may correspond to 20 Hz.

Assuming that the second frequency corresponding to the magnetic field sensed by the magnetic sensor is 200 Hz, the ratio of the second frequency to the first frequency is 10, and thus the speed of the vehicle may be calculated as 10 m/s (36 km/h), which is ten times as high as 1 m/s (3.6 km/h).

Alternatively, assuming that the second frequency corresponding to the magnetic field sensed by the magnetic sensor is 400 Hz, the ratio of the second frequency to the first frequency is 20, and thus the speed of the vehicle may be calculated as 20 m/s (72 km/h), which is 20 times as high as 1 m/s (3.6 km/h).

At this time, the first frequency corresponding to the alternating magnetic pattern may be standardized.

Assuming that an alternating magnetic pattern is constructed to be repeatedly alternated at intervals of 0.05 m on a road on which the maximum speed is 72 km/h, the speed of the vehicle may be recognized as 72 km/h when the second frequency is detected as 400 Hz. However, assuming that the alternating magnetic pattern is not maintained at regular intervals in some sections of the road and is constructed to be repeated at intervals of 0.5 m, and that the vehicle travels at the same speed, the second frequency is detected as 40 Hz, thus making it difficult to accurately detect the speed of the vehicle.

Therefore, the present invention may construct lane lines on the road so that the interval between alternating magnetic patterns is maintained at a regular interval, that is, so that the first frequency corresponding to the alternating magnetic pattern is standardized, regardless of whether the construction device is a construction device (having a small wheel) having a size that can be moved by a human hand or a construction device (having a large wheel) having a size such as that of a truck when lane lines are constructed on the road.

For this operation, the present invention may use the circumference of the wheel to be used to move the construction device and the radius of the wheel.

For example, assuming that the circumference of the wheel of the construction device is $2\pi R$, the radius of the wheel may be R. When the radius of the wheel is divided by the interval between magnetic alternating patterns, the number of times that the alternating magnetic field is to be changed when the wheel of the construction device is rotated once may be calculated, and thus the alternating magnetic field may be applied depending on the rotation angle of the wheel using the results of the calculation. Here, the rotation angle of the wheel may be measured based on a rotation detection sensor provided on the wheel or the shaft of the wheel, and the sensor and the alternating magnetic field generation apparatus are operated in conjunction with each other, thus enabling construction to be performed such that the first frequency is standardized regardless of the movement speed of the construction device.

Therefore, the present invention may maintain the interval between alternating magnetic patterns at a regular interval during a process for constructing lane lines based on the circumference of the wheel used in the construction device.

Here, when the second frequency is not uniform, a frequency-setting interval, in which the rate of change in the frequency is less than or equal to a preset reference value, of the entire period of the second frequency, may be detected, and the speed of the vehicle may be calculated using the second frequency corresponding to the frequency-setting interval.

For example, when the second frequency sensed by the magnetic sensor is uniform, it may be represented by a uniform period and a uniform amplitude, as illustrated in FIG. 18, but there is a strong possibility that the second frequency, which is typically sensed while the vehicle is traveling, will not be uniform, as illustrated in FIG. 19.

Here, when the second frequency sensed by the magnetic sensor is not uniform, as illustrated in FIG. 19, the present invention may detect a frequency-setting interval determined to be suitable for the measurement of the speed of the vehicle, and may use the frequency-setting interval to calculate the speed of the vehicle.

That is, assuming that the second frequency is sensed, as illustrated in FIG. 19, intervals during which frequency change is stable, of the entire period of the second frequency, may be set as frequency-setting intervals 1911 and 1912. Here, the intervals during which frequency change is stable may be set by comparing the frequency measured in the corresponding intervals with a preset reference frequency.

Furthermore, the frequency-setting intervals may be set using the rate of change in the strength of a measurement signal or in the amplitude of the measurement signal.

For example, an interval during which the strength of the measurement signal varies greatly, exceeding a preset change rate, may be excluded from the frequency-setting intervals. Here, the preset change rate may be obtained based on other sensor measurement values (e.g., a speed sensor, an acceleration sensor, a pedal motion sensor, a pedal angle sensor, etc.) measured in the vehicle, rather than values measured by the magnetic sensor.

In another example, an interval during which the amplitude of the measurement signal varies greatly, exceeding a preset change rate, may be excluded from the frequency-setting intervals.

In a further example, a frequency prediction value that is predicted based on other sensor measurement values measured in the vehicle may be generated, and may be compared with an actually measured frequency, and thus an interval in which the frequencies are not similar to each other may be excluded from frequency-setting intervals. For example, when frequency change decreases on the contrary in an interval in which the speed is predicted to gradually increase depending on the pedal angle measurement value, the corresponding interval may be excluded from the frequency-setting intervals.

In this case, a candidate interval determined to be excluded from frequency-setting intervals may be established based on a preset error range, and the candidate interval is subdivided into preset reference units and then analyzed, and thus a final interval to be excluded from frequency-setting intervals may be determined.

For example, assuming that the preset error range is N and the location of an interval at which the strength of a measurement signal varies maximally, exceeding the preset change rate, is A, a range from (A−N) to (A+N) may be established as the candidate interval. Thereafter, assuming that the preset reference unit is B, the candidate interval is subdivided into B units and is precisely analyzed, and thus the final interval to be excluded from the frequency-setting intervals may be determined.

Here, the amplitude of the second frequency may vary with the distance between the magnetic sensor and each lane line. For example, when the vehicle is traveling while being spaced apart from the corresponding lane line by a predetermined distance, the second frequency may be detected with a relatively uniform amplitude. However, as the vehicle becomes closer to the lane line, the amplitude of the second frequency may increase, whereas as the vehicle becomes far away from the lane line, the amplitude of the second frequency may decrease.

Further, the processor 2230 may determine whether the vehicle is traveling at an excessive speed based on the speed limit of the road and the speed of the vehicle, and may provide an alarm to the driver of the vehicle or provide feedback causing the control module of the vehicle to reduce the speed if it is determined that the vehicle is traveling at an excessive speed.

Here, the method for providing an alarm to the driver is not limited to a specific method, and methods capable of stimulating various senses, such as visual, auditory, touch, and olfactory senses of the driver, may be utilized.

The memory 2240 may store various types of information generated during a process in which the vehicle detects multiple lane lines and measures the speed according to the embodiment of the present invention.

Further, as described above, the memory 2240 may support functions for the vehicle according to an embodiment of the present invention. Here, the memory 2240 may be operated as separate large-capacity storage, and may include a control function for performing operations.

Meanwhile, the vehicle may be equipped with memory, and may internally store information in the device. In an embodiment, the memory may be a computer-readable storage medium. In an embodiment, the memory may be a volatile memory unit, and in another embodiment, the memory may be a nonvolatile memory unit. In an embodiment, a storage device may be a computer-readable storage medium. In various different embodiments, the storage device may be a computer-readable storage medium. In various different embodiments, the storage device may include, for example, a hard disk device, an optical disk device or any other mass storage device.

By means of such a vehicle, it is possible to detect lane lines or measure speed without being influenced by weather conditions or visibility, thus preventing a critical accident that may occur when lane lines are detected using other methods.

As described above, in the magnetic field generation method, the lane detection method using a magnetic field, and the vehicle using the same according to the present invention, the configurations and schemes in the above-described embodiments are not limitedly applied, and some or all of the above embodiments can be selectively combined and configured such that various modifications are possible.

The invention claimed is:
1. A lane detection method, comprising:
sensing magnetic fields corresponding to magnetic particles included in multiple lane lines based on a magnetic sensor attached to a vehicle;

setting at least one of magnetic field correction intervals with reference to a first rate of change in the magnetic field intensity for the sensed magnetic fields;
correcting data corresponding to the magnetic field correction intervals; and
detecting multiple lane lines based on the corrected data corresponding to magnetic fields,
wherein the at least one of magnetic field correction intervals are set with reference to a second rate of change in vehicle sensor data as well as the first rate of change in the magnetic field intensity for the sensed magnetic fields.

2. The lane detection method of claim 1, further comprising classifying types of the multiple lane lines based on the magnetic fields.

3. The lane detection method of claim 2, wherein the classifying is configured to classify the types of the multiple lane lines based on any one of a magnetic field intensity corresponding to each of the lane lines and a change in a magnetic field attributable to a magnetization pattern.

4. The lane detection method of claim 1, further comprising:
generating information about a distance between at least one of the multiple lane lines and the vehicle based on the magnetic fields and generating information about an on-road location of the vehicle on a road using the distance information; and
generating at least one of a driving control signal for the vehicle and an alert notification for a driver based on the on-road location information.

5. The lane detection method of claim 1, wherein setting the at least one of magnetic field correction intervals is configured to set the magnetic field correction intervals in consideration of vehicle sensor data, corresponding to the intervals in which the rate of change in the magnetic field intensity is equal to or greater than the preset reference change rate.

6. The lane detection method of claim 1, further comprising:
sensing a magnetic field generated from magnetic particles included in each lane line based on the magnetic sensor; and
calculating a speed of the vehicle using an alternating magnetic pattern of the lane line and the sensed magnetic field.

7. A lane detection method, comprising:
sensing magnetic fields corresponding to magnetic particles included in multiple lane lines based on a magnetic sensor attached to a vehicle;
detecting multiple lane lines based on the magnetic fields;
sensing a magnetic field generated from magnetic particles included in each lane line based on the magnetic sensor; and
calculating a speed of the vehicle using an alternating magnetic pattern of the lane line and the sensed magnetic field,
wherein the calculating is configured to calculate the speed of the vehicle based on a ratio of a second frequency corresponding to a frequency of the sensed magnetic field to a first frequency corresponding to a frequency of the alternating magnetic pattern.

8. The lane detection method of claim 6, further comprising:
determining, based on a speed limit of the road and the speed of the vehicle, whether the vehicle is violating the speed limit; and
if it is determined that the vehicle is violating the speed limit, providing an alarm to a driver of the vehicle or providing feedback causing a control module of the vehicle to reduce the speed.

9. A lane detection method, comprising:
sensing magnetic fields corresponding to magnetic particles included in multiple lane lines based on a magnetic sensor attached to a vehicle;
detecting multiple lane lines based on the magnetic fields; and
classifying types of the multiple lane lines based on the magnetic fields,
wherein the classifying is configured to classify the types of the multiple lane lines based on any one of a magnetic field intensity corresponding to each of the lane lines and a change in a magnetic field attributable to a magnetization pattern, and
wherein the magnetic sensor is a composite sensor in which a high-sensitivity sensor and a low-sensitivity sensor are combined with each other.

10. The lane detection method of claim 9, wherein the magnetic sensor is configured to generate pieces of sensing information for respective sensing sensitivity levels by combining a result of sensing by the high-sensitivity sensor with a result of sensing by the low-sensitivity sensor.

11. A lane detection method, comprising:
sensing magnetic fields corresponding to magnetic particles included in multiple lane lines based on a magnetic sensor attached to a vehicle;
detecting multiple lane lines based on the magnetic fields;
generating information about a distance between at least one of the multiple lane lines and the vehicle based on the magnetic fields and generating information about an on-road location of the vehicle on a road using the distance information; and
generating at least one of a driving control signal for the vehicle and an alert notification for a driver based on the on-road location information,
wherein generating the on-road location information is configured to acquire magnetic field sensing signals, obtained by sensing the magnetic fields from left and right portions of the vehicle based on magnetic sensor units constituting the magnetic sensor, and to generate the distance information using a difference between signal strengths of the magnetic field sensing signals.

12. The lane detection method of claim 11, wherein each of the magnetic sensor units senses the magnetic fields from at least one of left/right, front, middle, and back portions of the vehicle.

13. The lane detection method of claim 1, further comprising generating inter-vehicle information including at least one of a location of an additional vehicle located near the vehicle and a distance between the vehicle and the additional vehicle based on a degree of distortion of the magnetic fields attributable to the additional vehicle.

14. A magnetic field generation method using road-marking paint, comprising:
applying the road-marking paint onto a road so as to indicate a lane line;
generating an alternating magnetic field corresponding to an alternating magnetic pattern to be applied to the lane line based on a rotation angle of a wheel of a construction device that applies the road-marking paint onto the road;
applying the generated alternating magnetic field to the magnetic particles; and outputting a magnetic field sensed by a vehicle to which a magnetic sensor is attached, in accordance with magnetic particles included in the road-marking paint, wherein the magnetic particles are configured such that any one of an addition concentration, a magnetization pattern, and a remanent magnetization property is set differently depending on a type of each lane line.

15. The magnetic field generation method of claim 14, wherein the generating is configured to calculate a number of magnetic field alternations for maintaining the alternating magnetic pattern on a lane line constructed while the construction device is moved in accordance with the rotation angle of the wheel, and to generate an alternating magnetic field corresponding to the calculated number of magnetic field alternations.

16. A vehicle, comprising:

a magnetic sensor for sensing magnetic fields corresponding to magnetic particles included in multiple lane lines; and a processor for detecting multiple lane lines based on the magnetic fields, wherein the multiple lane lines are detected by using corrected data corresponding to the magnetic fields, wherein the corrected data are generated in at least one of magnetic field correction intervals which are set with reference to a rage of change in the magnetic field intensity for the sensed magnetic fields, wherein the at least one of magnetic field correction intervals are set with reference to a second rate of change in vehicle sensor data as well as the first rate of change in the magnetic field intensity for the sensed magnetic fields.

\* \* \* \* \*